US008955030B2

(12) United States Patent
Heie et al.

(10) Patent No.: US 8,955,030 B2
(45) Date of Patent: Feb. 10, 2015

(54) SYSTEM AND METHOD FOR PERSONAL CONTENT ACCESS

(75) Inventors: Anders Heie, Poway, CA (US); Adam F. Gould, San Diego, CA (US); Michael S. Librizzi, San Diego, CA (US)

(73) Assignee: Wi-LAN, Inc., Ottawa, Ontario (CA)

(*) Notice: Subject to any disclaimer, the term of this patent is extended or adjusted under 35 U.S.C. 154(b) by 654 days.

(21) Appl. No.: 11/690,706

(22) Filed: Mar. 23, 2007

(65) Prior Publication Data

US 2008/0235733 A1 Sep. 25, 2008

(51) Int. Cl.
*H04N 7/16* (2011.01)
*H04N 7/18* (2006.01)
*H04N 7/173* (2011.01)
*H04N 5/765* (2006.01)
*H04N 21/414* (2011.01)
*H04N 21/45* (2011.01)
*H04N 21/475* (2011.01)
*H04N 21/482* (2011.01)
*H04N 21/845* (2011.01)

(52) U.S. Cl.
CPC .......... *H04N 7/163* (2013.01); *H04N 7/17318* (2013.01); *H04N 21/41407* (2013.01); *H04N 21/4532* (2013.01); *H04N 21/4753* (2013.01); *H04N 21/482* (2013.01); *H04N 21/8455* (2013.01)
USPC ................ 725/135; 725/83; 725/88; 386/200

(58) Field of Classification Search
USPC ......... 725/135, 46, 81, 85, 100, 98, 139, 151, 725/34; 709/246, 217, 229
See application file for complete search history.

(56) References Cited

U.S. PATENT DOCUMENTS

| 5,710,631 | A | 1/1998 | Bou-Ghannam et al. |
| 5,732,216 | A * | 3/1998 | Logan et al. .................. 709/203 |
| 6,043,802 | A | 3/2000 | Gormish |
| 6,600,869 | B1 * | 7/2003 | Chen et al. ..................... 386/278 |
| 6,658,000 | B1 | 12/2003 | Raciborski et al. |
| 6,785,688 | B2 | 8/2004 | Abajian et al. |
| 6,877,024 | B1 | 4/2005 | Ukigawa et al. |
| 6,941,300 | B2 | 9/2005 | Jensen-Grey |
| 7,047,305 | B1 | 5/2006 | Brooks et al. |
| 7,129,988 | B2 | 10/2006 | Wang et al. |
| 7,289,464 | B2 | 10/2007 | Li et al. |
| 7,478,417 | B2 | 1/2009 | Sakamoto et al. |
| 7,515,710 | B2 * | 4/2009 | Grab et al. ..................... 380/201 |
| 7,624,412 | B2 * | 11/2009 | McEvilly et al. ............... 725/46 |

(Continued)

FOREIGN PATENT DOCUMENTS

GB 2390452 B 4/2005
WO 0244843 A2 6/2002

*Primary Examiner* — Oschta Montoya
(74) *Attorney, Agent, or Firm* — Volpe and Koenig, P.C.

(57) ABSTRACT

A method and system for integrated personal content access have been disclosed. The system includes a gateway which is able to communicate across devices, coordinating media content distribution among the devices and users. The gateway can seamlessly switch or copy content streams from one device to another, even if the devices use different formats or protocols. Tags can be used for adding embellishments to content on the fly for viewing by the user or by others. Tokens for indicating the identity and source of content, along with a location within the content, can also be used when sharing content or when switching content viewing between devices. Additionally, a network of gateways is possible, where content may be shared between devices connected to different gateways.

19 Claims, 21 Drawing Sheets

(56) References Cited

U.S. PATENT DOCUMENTS

| | | | |
|---|---|---|---|
| 7,669,213 B1* | 2/2010 | Wick et al. | 725/37 |
| 7,720,836 B2 | 5/2010 | Abajian et al. | |
| 7,921,686 B2 | 4/2011 | Bagepalli et al. | |
| 8,020,007 B1 | 9/2011 | Zubovsky | |
| 8,285,681 B2 | 10/2012 | Prahlad et al. | |
| 2002/0035697 A1 | 3/2002 | McCurdy et al. | |
| 2002/0159464 A1 | 10/2002 | Lewis | |
| 2003/0038897 A1* | 2/2003 | Shiotsu | 348/725 |
| 2003/0055849 A1 | 3/2003 | Thure et al. | |
| 2003/0056093 A1 | 3/2003 | Huitema et al. | |
| 2003/0163474 A1* | 8/2003 | Herz | 707/100 |
| 2004/0030982 A1* | 2/2004 | Aldridge et al. | 714/776 |
| 2004/0064707 A1* | 4/2004 | McCann et al. | 713/185 |
| 2004/0122958 A1* | 6/2004 | Wardrop | 709/229 |
| 2005/0117031 A1* | 6/2005 | Russon et al. | 348/231.2 |
| 2005/0132401 A1* | 6/2005 | Boccon-Gibod et al. | 725/34 |
| 2005/0182941 A1 | 8/2005 | Della-Libera et al. | |
| 2005/0193015 A1 | 9/2005 | Logston et al. | |
| 2005/0210145 A1 | 9/2005 | Kim et al. | |
| 2005/0251563 A1* | 11/2005 | Berranger et al. | 709/217 |
| 2005/0262539 A1* | 11/2005 | Barton et al. | 725/90 |
| 2006/0015908 A1* | 1/2006 | Vermola et al. | 725/63 |
| 2006/0026502 A1* | 2/2006 | Dutta | 715/511 |
| 2006/0031316 A1 | 2/2006 | Forstadius | |
| 2006/0112161 A1 | 5/2006 | Spalink et al. | |
| 2006/0116978 A1 | 6/2006 | Murozumi et al. | |
| 2006/0123053 A1 | 6/2006 | Scannell, Jr. | |
| 2006/0143650 A1 | 6/2006 | Tanikawa et al. | |
| 2006/0150115 A1 | 7/2006 | Jin et al. | |
| 2006/0262220 A1* | 11/2006 | Nakamura et al. | 348/553 |
| 2007/0047902 A1* | 3/2007 | Ito et al. | 386/46 |
| 2007/0047909 A1* | 3/2007 | Toyama et al. | 386/95 |
| 2007/0061487 A1* | 3/2007 | Moore et al. | 709/246 |
| 2007/0061835 A1* | 3/2007 | Klein et al. | 725/25 |
| 2007/0078948 A1 | 4/2007 | Julia et al. | |
| 2007/0118847 A1 | 5/2007 | Sugimoto et al. | |
| 2007/0180470 A1* | 8/2007 | Gill et al. | 725/52 |
| 2007/0250591 A1 | 10/2007 | Milic-Frayling et al. | |
| 2007/0250900 A1* | 10/2007 | Marcuvitz | 725/141 |
| 2008/0131019 A1* | 6/2008 | Ng | 382/255 |
| 2008/0162712 A1* | 7/2008 | Fu et al. | 709/231 |
| 2008/0163317 A1 | 7/2008 | Mills | |
| 2008/0163330 A1* | 7/2008 | Sparrell | 725/142 |
| 2008/0215170 A1 | 9/2008 | Milbrandt et al. | |
| 2009/0013195 A1 | 1/2009 | Ochi et al. | |

* cited by examiner

SYSTEM AND METHOD FOR PERSONAL CONTENT ACCESS

CROSS-REFERENCE TO RELATED APPLICATIONS

This patent application is related to co-pending U.S. patent application entitled, "System and Method for Content Distribution", Ser. No. 11/690,711, filed on Mar. 23, 2007, and assigned to the same assignee.

FIELD OF THE INVENTION

The present invention relates to multimedia content access, and particularly to the integration of multimedia personal content access across various devices.

BACKGROUND OF THE INVENTION

The typical home environment includes a number of various users, such as family members, with different interests in multimedia content. Such a typical home environment often includes access to television programming content through a cable service or through a satellite dish service, which can provide television programming to various television devices within the home. A digital video recorder device can also be included in the home system to store recorded video content from the television service. In addition, the typical home environment also often includes an access point for Internet access in the home, such as a cable modem or dial-up service, to provide Internet service to various computers and Internet-enabled devices used within the home. In this manner, multimedia content in the form of television program content, Internet content, stored music and images can exist within a home environment, but not in a coordinated fashion in which specific content is correlated to particular devices in the home or to particular users.

Users within a home, network, or community each own various devices capable of playing multimedia content, such as televisions, computers and mobile devices like PDAs and cell phones. When one user wishes to share content with another user, either within the same home, network, or community, or with users outside of them, the user typically has to speak with the others personally, send an email, call the others, or send an instant message. The other users may not be able to find the content or have access to it. The sharing of content in this manner is cumbersome and inefficient.

Problems also exist when the user wishes to switch content from one device to another of the user's devices. For example, the user may begin watching content at a TV and may wish to continue watching the content on a mobile device when the user leaves the house. In the current state of the art, the user is required to find a separate stream for the content that can be played on the mobile device. The user additionally has to find the location within the content where he left off.

In the current typical home environment, it is difficult and cumbersome for one of the users, such as a parent, to monitor or control the access to multimedia content by another user, such as a child. For example, current television systems allow a parent to block particular channels ahead of time, but do not provide the ability for a parent to remotely grant permission for a child to watch a particular program upon request by the child at the time the program is being shown. Also, the only way for a parent to monitor what the child is currently viewing is for the parent to physically be present near the device that the child is viewing.

Thus, devices within a home, network, or community are not integrated so that multimedia content can be coordinated between devices and users. Accordingly, there exists a need for an integrated personal content access system and method.

SUMMARY OF THE INVENTION

A method and system for integrated personal content access have been disclosed. The system includes a gateway which is able to communicate across devices, coordinating media streams between them. The gateway can seamlessly switch or copy content streams from one device to another, even if the devices use different formats or protocols. Tags can be used to add embellishments to content on the fly for viewing by the user or by others. Tokens for indicating the identity and source of the content, along with a location within content, can also be used when sharing content or when switching content viewing between devices. Additionally, a network of gateways is possible, where content may be shared between devices connected to different gateways.

DETAILED DESCRIPTION

The present invention provides an integrated personal content access system and method. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
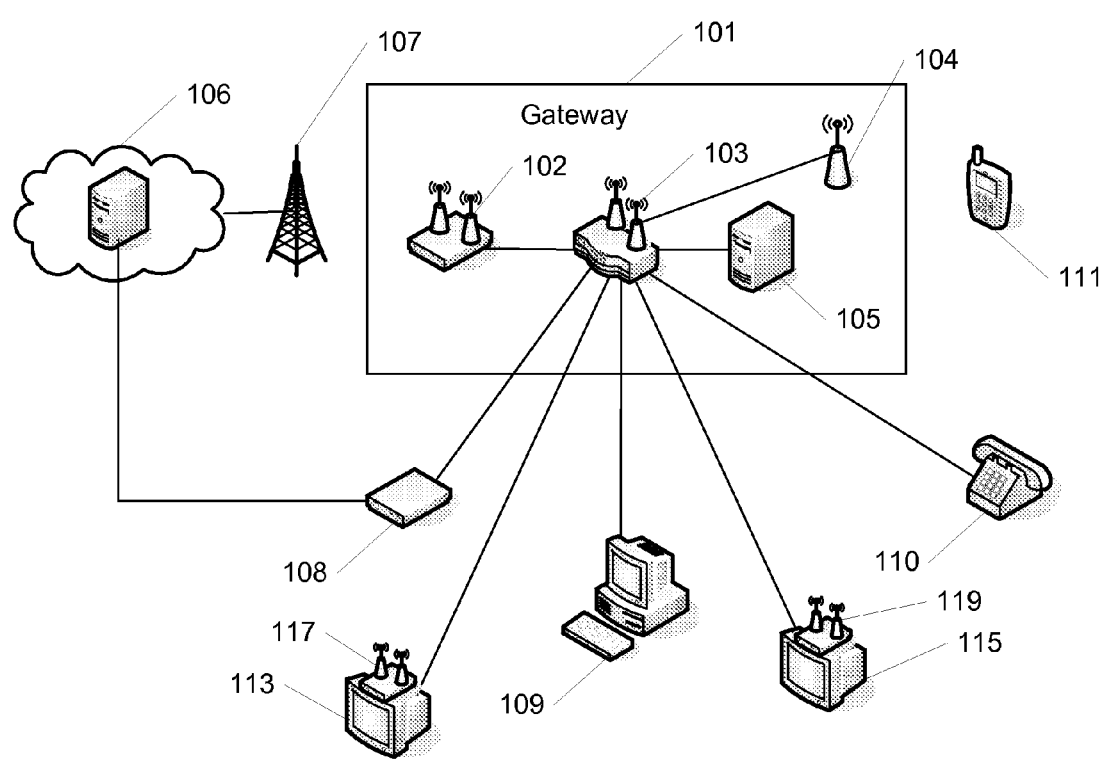
FIGS. 1A and 1B illustrate an embodiment of a system for integrated personal content access.
Figure 1B:
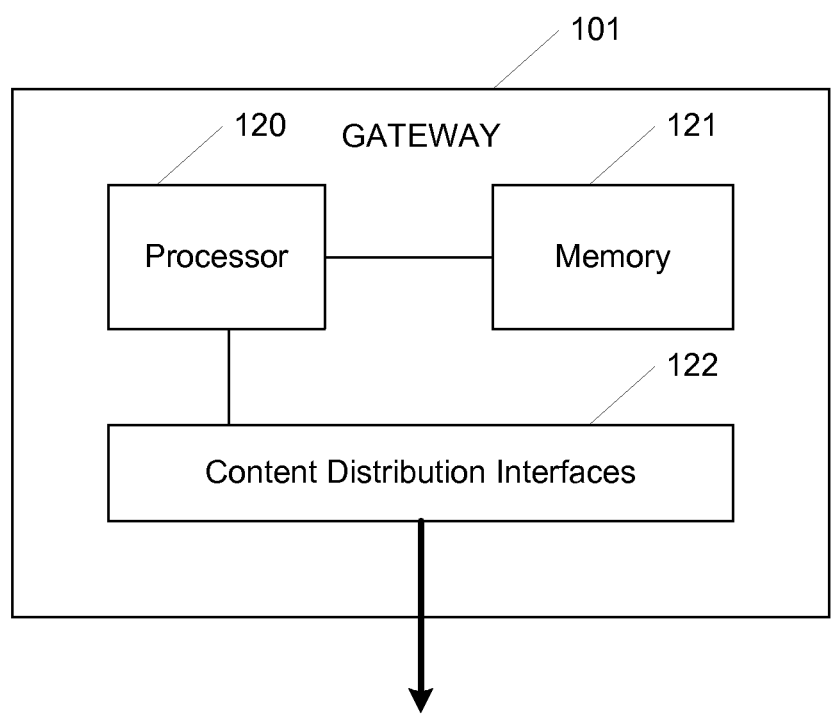

FIG. 1A illustrates an embodiment of a system for integrated personal content access. The system comprises a content management device, i.e., a "gateway" 101. As illustrated in FIG. 1B, the gateway 101 comprises a processor 120, a memory 121, and one or more content distribution interfaces 122. At least one computer-executable instruction sequence stored on the memory 121 can be executed by the processor 120 to provide the features as described below. Through these features, the gateway 101 is able to communicate with various media devices in the home, network, or community via the content distribution interfaces 122, and can coordinate multimedia content between the devices and the between users. In general, the example of gateway 101 shown in FIGS. 1A and 1B connects a home with the outside world through a wireless WAN service, such as a WiMAX wireless WAN or other type of wireless WAN, via wireless WAN client modem 102, and also through an external cable/DSL service (cable modem 108), both of which are distributed via router 103. Wireless WAN client modem 102 is in communication with wireless WAN base station 107 of a wireless WAN, which supports voice communication and content distribution via WAN 106, such as the Internet. Similarly, cable/DSL service is ultimately provided to cable modem 108 via a cable/DSL provider through WAN 106, such as the Internet. In this manner, users within the home can access television programming and Internet content via the cable/DSL service, and can also access voice services (such as VOIP) and content via the wireless WAN network. Router 103 can be both a wired and a wireless router, such as 802.11 WiFi, for providing a wired and wireless LAN within the home. Gateway 101 also includes content management server 105 which stores content and which stores information relating to content in correlation with devices and users within the home. Lastly, gateway 101 shown in FIGS. 1A and 1B includes a wireless WAN access point 104 for supporting access to the wireless WAN, such as WiMAX, by devices within the home which otherwise may not have sufficient access to the wireless WAN base station 107. The devices supported by gateway 101 can include personal computers and multimedia servers 109, voice over IP (VoIP) phones 110, wireless WAN enabled devices 111 such as cell phones, laptops and the like, and also televisions 113 and 115 via media adaptors 117 and 119. In this regard, each media adaptor provides connectivity to gateway 101 via wired network cable, wireless LAN or wireless WAN and translates multimedia content sent from the gateway for viewing on the television. Support by gateway 101 of other devices and other protocols are also possible. Accordingly, the gateway 101 is able to communicate with the various devices and is able to coordinate the distribution of media content between them in a desired manner as discussed more fully below. Additionally, a network of gateways is possible, where content may be shared between devices connected to the different gateways.

To facilitate integrated personal content access, the gateway 101 uses tags and tokens to embellish and represent content, respectively. A tag contains data which is used to embellish the content. A token contains information about the identity and source of the content, along with a specific location within the content.

Figure 2A:
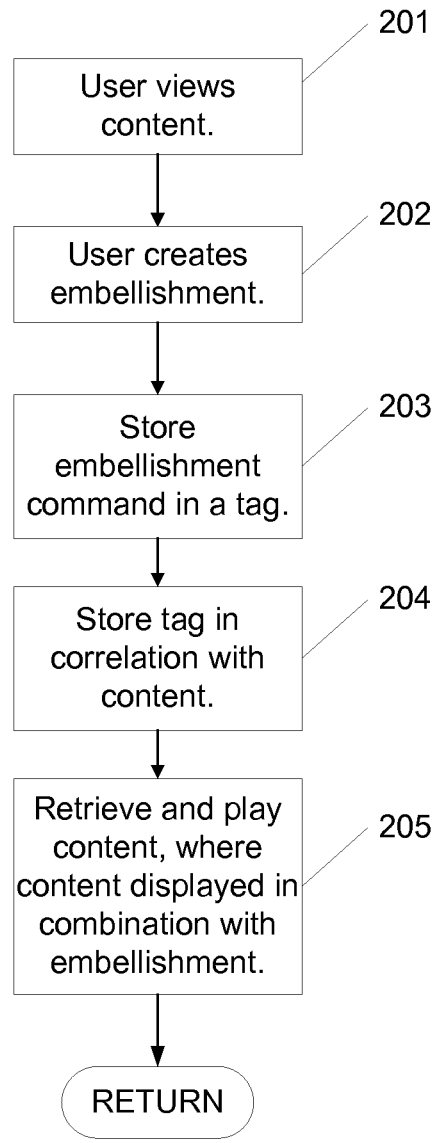
FIGS. 2A and 2B are flowcharts illustrating an example of integrated personal content access.
Figure 2B:
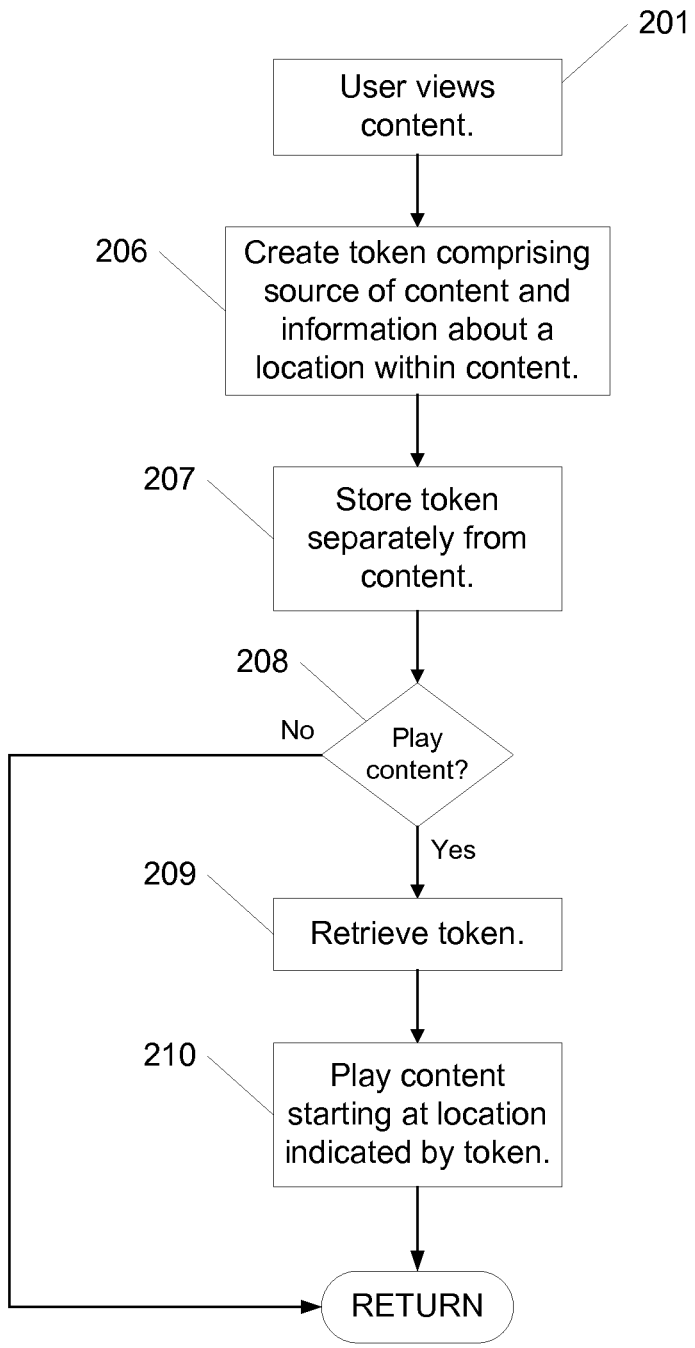

FIGS. 2A and 2B are flowcharts for illustrating an example of integrated personal content access according to one embodiment of the invention. FIG. 2A describes the use of tags by a user to embellish content, and FIG. 2B describes the use of tokens to represent content along with a specific location in the content. These functions can be performed independently or together. In FIG. 2A, a user views content (step 201) on a device associated with a gateway 101. The user can decide to embellish the content or store a location within the content, or both. If the user decides to embellish the content, the user first creates the embellishment (step 202), such as notes, pop-ups, voice-overs, filters or effects, etc. The gateway 101 receives an embellishment command and stores it in a tag (step 203), and the tag is stored in correlation with the content (step 204). In one embodiment, the tag is stored embedded in the content. In another embodiment, the tag is stored separately from the content, such as within the memory 121 of the gateway 101, and the tag includes a unique identifier for the content. The gateway 101 would correlate the tag with the content on the fly. When the content is retrieved and played (step 205), the content is displayed in combination with the embellishment.

Here, the embellishment is not pre-rendered with the content before the content is displayed. Tags thus allow one to edit the content on the fly, without changing the content itself. If the tags are stored separately from the content, then the tags can be shared separately from the content, allowing greater flexibility in content embellishment, especially in a community environment, where multiple users can add tags to the same content.

Tags can be constructed using XML. Example fields include: content identifier; type of tag (note-bubble, sound, filter, text, banner, multimedia, etc.); duration; location; size; move-path (points, durations, splines, etc. with timing information); effects (fade in, fade out, explode, implode, etc.); text; and next tag (if tags are sequenced). Other variations or combinations of fields are possible.

In FIG. 2B, the user can decide to store a location within the content. A token is created comprising information about the identity and source of the content, along with the location within the content (step 206), and the token is stored (step 207). In one embodiment, the token is stored embedded with the content. In another embodiment, the token is stored separately from the content, such as in memory 121 of the gateway 101. A token is used for identifying the content and its source, and for "pointing" to a specific location within the content. If the content is to be played (step 208), the token is then retrieved (step 209) by the gateway 101, and the content is played starting at the location indicated by the token (step 210).

As with tags, a token can be constructed using XML. Example fields include: a unique identifier for the content; a location of the content source; a frame-location in the content; text describing the token, length of a clip, action to take (autoplay, pause, etc.); or link to the next token (if tokens are sequenced). In addition to the unique identifier of the content, multiple alternate sources can be listed as backup options for retrieving the content. The unique identifier can contain the source (TV channel, URL, etc.) and time of the original source. In the frame-location, an exact frame can be referenced, where the playback would begin. The frame location can be frame based or time-offset based. Multiple frame locations can be specified.

Tokens can be created when users wish to share the content with others, or for self-consumption. They can be passed around by the gateway 101 independently of the content. For example, a list of paused programs could be stored using tokens. The user can then view the list and continue any of them at the location indicated by the respective token. Other potential uses for tokens include the gateway 101 storing tokens as part of the Nielsen Ratings, capturing what people are watching, when they change channels, etc. A list of tokens can also be used to create slideshows, which could include video clips, the beginning and ending locations of which are stored in the tokens.

For example, a teenage girl is watching television. At one point during a music video, she sees a dress she really likes. She pauses the playback and adds a tag to the content. The tag specifies: a note-bubble on the display, at a set of coordinates, using a particular graphic of a particular size; show the note for 4 seconds; note text of "Mom, I want a dress like this for my prom!"; content identifier; content start frame; and note-bubble pop-up sound. The tag is stored along with the video on the gateway 101. Later, she tells her mom to watch the video, and when the frame is reached, the gateway 101 interprets the tag and superimposes the note-bubble on top of the content. Mom then decides to share it with the girl's father. She selects "share now" on the gateway 101 and a token is generated. The token specifies: unique identifier of the content; and a specific place in the content (for example, 10 seconds prior to the note-bubble). Mom sends this token to the father, who plays it back. Here, the content is locally stored on the Mom's gateway, so the father's gateway communicates with the Mom's gateway, and a stream of the content is created between the gateways. The note-bubble is generated from Mom's gateway and the father sees the clip, starting at the location indicated by the token.

The use of tags and/or tokens in the personal content access system allows the gateway 101 to provide several features, including: content transfer feature, content sharing feature; content access monitoring feature; content access approval feature; simulated multimedia streams feature; and shadow download feature. Each of these features is described below.

Content Transfer Feature

Occasionally, a user is watching a multimedia content at one device, but then decides to continue watching the same multimedia content on a different device. In the current state of the art, the user would need to find a stream for the other devices, restart the multimedia stream on the other devices, and find the location where the user left off. There is no coordination of streams between the devices.

The gateway 101 solves this problem by providing the content transfer feature. The gateway 101 is aware of the streams to the devices and coordinates them. Each time a user moves to another device, the gateway 101 can provide a list of existing ongoing streams and allow the user to pick any stream on the list. Since the gateway 101 is aware of the streams, it can redirect or copy the stream to a new device, starting at the same or different location to allow for a seamless transfer. If a stream is paused, the gateway 101 stores a token for the stream, indicating the location of the pause. The stream can be resumed at a later time at the indicated location. The token could be shared with others, for instance through Internet communities, so that others can play the content starting at the location indicated by the token.

Figure 3:
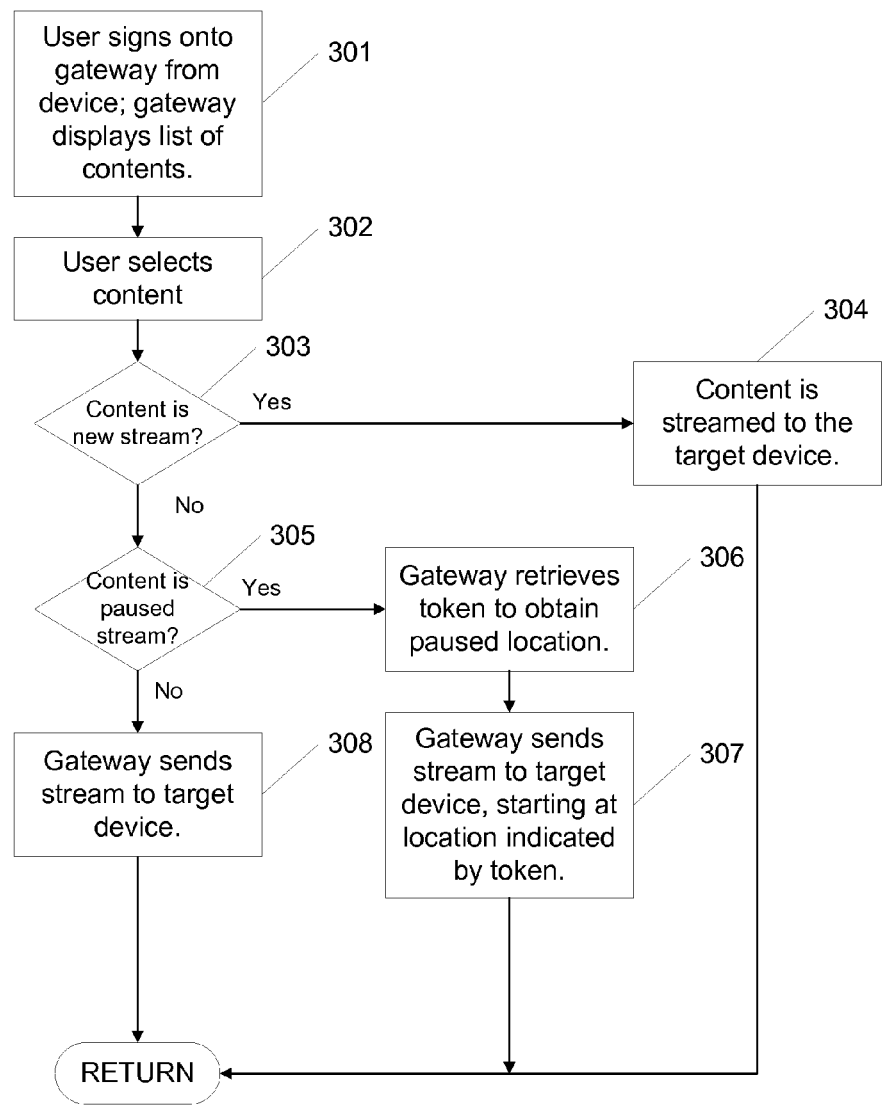
FIG. 3 is a flowchart illustrating the content transfer feature provided by the gateway.

FIG. 3 is a flowchart illustrating the content transfer feature provided by the gateway 101. First, the user signs onto the gateway 101 from a device, and the gateway 101 displays a list of contents (step 301). The user selects a content on the list (step 302). If the selected content is a new content stream for which a token is not saved in the gateway, such as when the user has not previously viewed and paused the content, (step 303), the gateway 101 streams the content to a target device (step 304). For example, the target device can be the device from which the user signs onto the gateway 101. The device can also be the device to which the user wishes to switch the stream. If the selected content is not a new stream, and the content is a paused stream (step 305), then the gateway 101 retrieves the token to obtain the paused location (step 306). The gateway 101 sends the stream to the target device, starting at the location indicated by the token (step 307). If the selected content is not a new stream (step 303) or a paused stream (step 305), then the gateway 101 simply sends the stream to the target device (step 308).

As the user moves between devices, the source of the content may change to limit latencies and delays. For example, the stream for a program delivered to a home may come through a commercial TV channel. If the user leaves the home and uses a mobile device, a better source could be a digital video broadcasting—handheld (DVB-H) source. As the user accesses his personal content menu on the device, the gateway 101 examines the available sources for the content and directs the user to the most appropriate. This can be done by looking at program guides, checking from where similar content is available, and making a choice based on price, bandwidth, latencies, etc., pre-determined by user settings. Alternatively, the user may be able to select one of the sources directly. It is also possible that the gateway 101 streams the content directly to the device.

Figure 4:
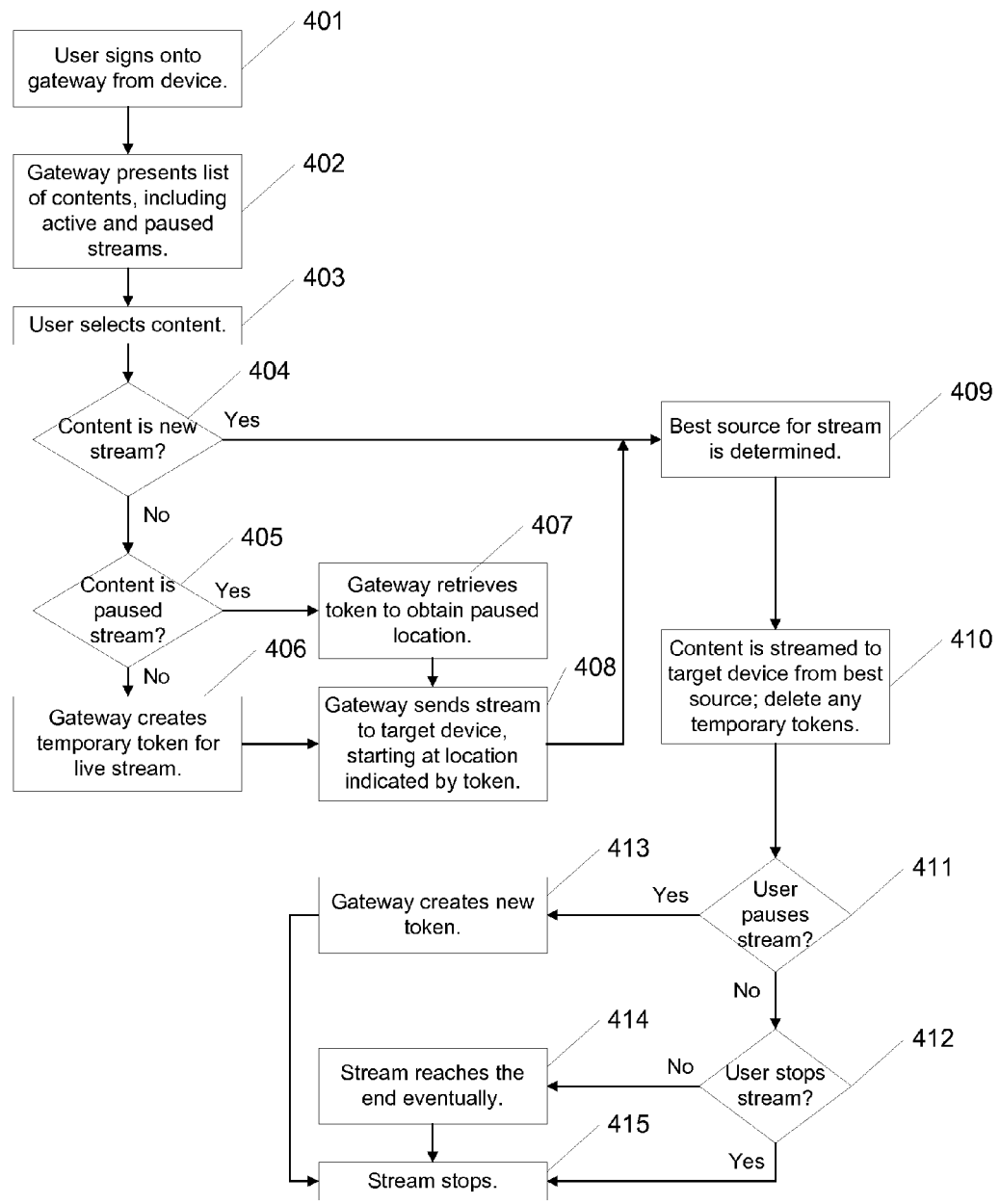
FIG. 4 is a flowchart illustrating in more detail the content transfer feature.

FIG. 4 is a flowchart illustrating in more detail the content transfer feature. After the user signs onto the gateway 101 from a device (step 401), the gateway 101 presents the list of contents, which includes active and paused streams (step 402). From the list, the user selects a content (step 403). If the selected content is not new (step 404), and the content is not a paused stream (step 405), then the stream is live, and the gateway 101 creates a temporary token for the live stream (step 406). The temporary token for the live stream contains the same type of information as a token created for a paused stream, except the temporary token is not stored on the gateway 101 for as long of a period of time. The temporary token is stored only for the duration of the transfer of the live stream. The gateway 101 then sends the stream to the target device, starting at the location indicated by the token (step 408). Optionally, the live stream can be continued or replayed from the beginning, without the need for a token. If the selected content is not a new stream (step 404) but is a paused stream (step 405), then the gateway 101 retrieves the token to obtain the paused location (step 407). The gateway then sends the stream to the target device, starting at the location indicated by the token (step 408). The gateway 101 determines the best source for the stream (step 409). Step 409 is described in more detail with FIG. 5 below. The content is then streamed to the target device from the best source (step 410), and any temporary tokens are deleted.

During playback, the user has the option to pause the stream (step 411). The gateway 101 then creates a new token (step 413), which stores the location at which the pause occurs, and the stream stops (step 415). The user can choose to stop the stream instead (step 412) or allow the stream to reach the end eventually (step 414).

The token includes information about the content, as well as information about one or more locations within the content. For example, a user pauses a TV program at 5:57 pm. A token can be created that specifies the channel, program, local channel #(31), and time (5:57 pm Pacific Time=17:57 Pacific time=09:57 UTC). The time can be stored in UTC (Universal Time Coordinated), in case the token is accessed from other time zones. Furthermore, the time offset at which the pause occurs relative to the beginning of the show can be recorded (0:0:57:00.000 (0 days, 0 hours, 57 minutes, 0 seconds). If the content is from the Internet, the token can include a Universal Resource Identifier (URI), of which a URL is a subset. If the content is local, the gateway 101 can generate a URI that can be used to get to the content via the gateway 101. This URI may be temporary.

Passing a token from one gateway to another gateway or device allows the receiver to identify the location within the content indicated by the token to the best of its ability. To alleviate the problem of content not being available, the gateway 101 can implement a system to automatically record a pre-determined number of minutes, or the rest of the program, when a token is created. Using the URI scheme presented above, the content can be found again.

Tokens can include an expiration date or time. The generated content could be erased when the token expires. Unlike conventional cookies used in web browsers, the token is related to content, and the deletion of a token may trigger deletion of content as well. Also copies of tokens can be passed around, whereas cookies are created locally in browsers.

Figure 5:
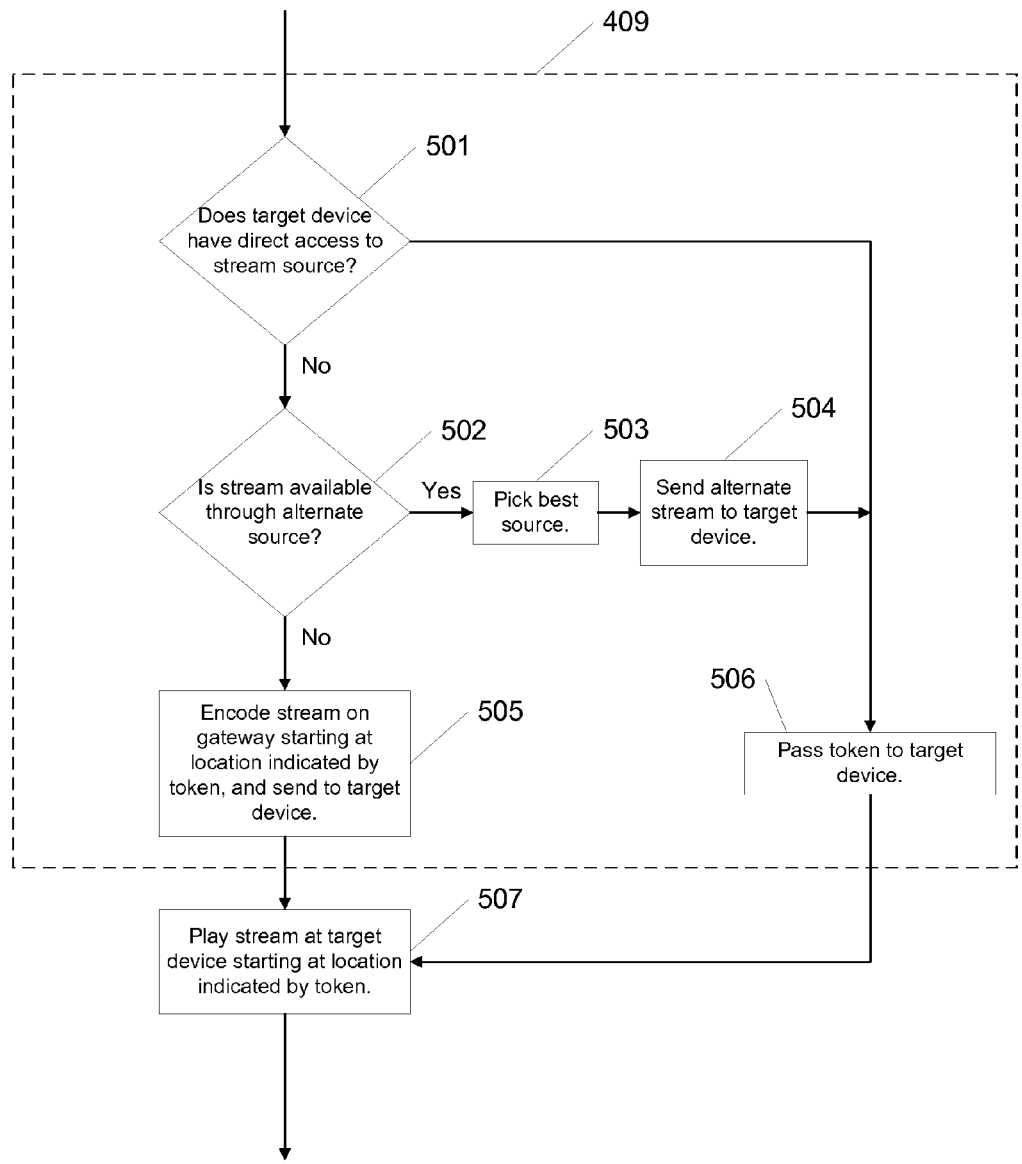
FIG. 5 is a flowchart illustrating in more detail the best source determination for the content transfer feature.

FIG. 5 is a flowchart illustrating in more detail the best source determination for the content transfer feature. First, the gateway 101 determines if the target device has direct access to the stream source (step 501). Direct access may include a TV channel with the same stream, even if the channel number may be different. If so, then the token is passed to the target device (step 506), and the stream is started at the location indicated by the token (step 507), and the stream is played at the target device starting at the location indicated by the token (step 507).

If the target device does not have direct access to the stream source (step 501), the gateway 101 determines if the stream is available through an alternate source (step 502), such as the Internet. If so, then the gateway 101 picks the best alternative stream source (step 503). Both the alternate stream source (step 504) and the token (step 506) are passed to the target device. The gateway 101 starts the stream from the alternate stream source at the location within the content that's indicated by the token (step 507), which is then played at the target device. If the stream is not freely available through other means (step 502), then the stream is encoded on the gateway 101 at the location indicated by the token and sent to the target device (step 505). The encoded stream is then played at the target device (step 507). The best source could also be determined even if no tokens are involved.

Optionally, the gateway 101 can either use a source with direct access or encode the stream on the gateway 101, without consideration of other means. Another option is for the gateway 101 to either use other means or encode the stream on the gateway 101, without consideration of sources with direct access. Another option is for the gateway 101 to always encode the stream on the gateway 101, without consideration of sources with direct access or other means.

Figure 6:
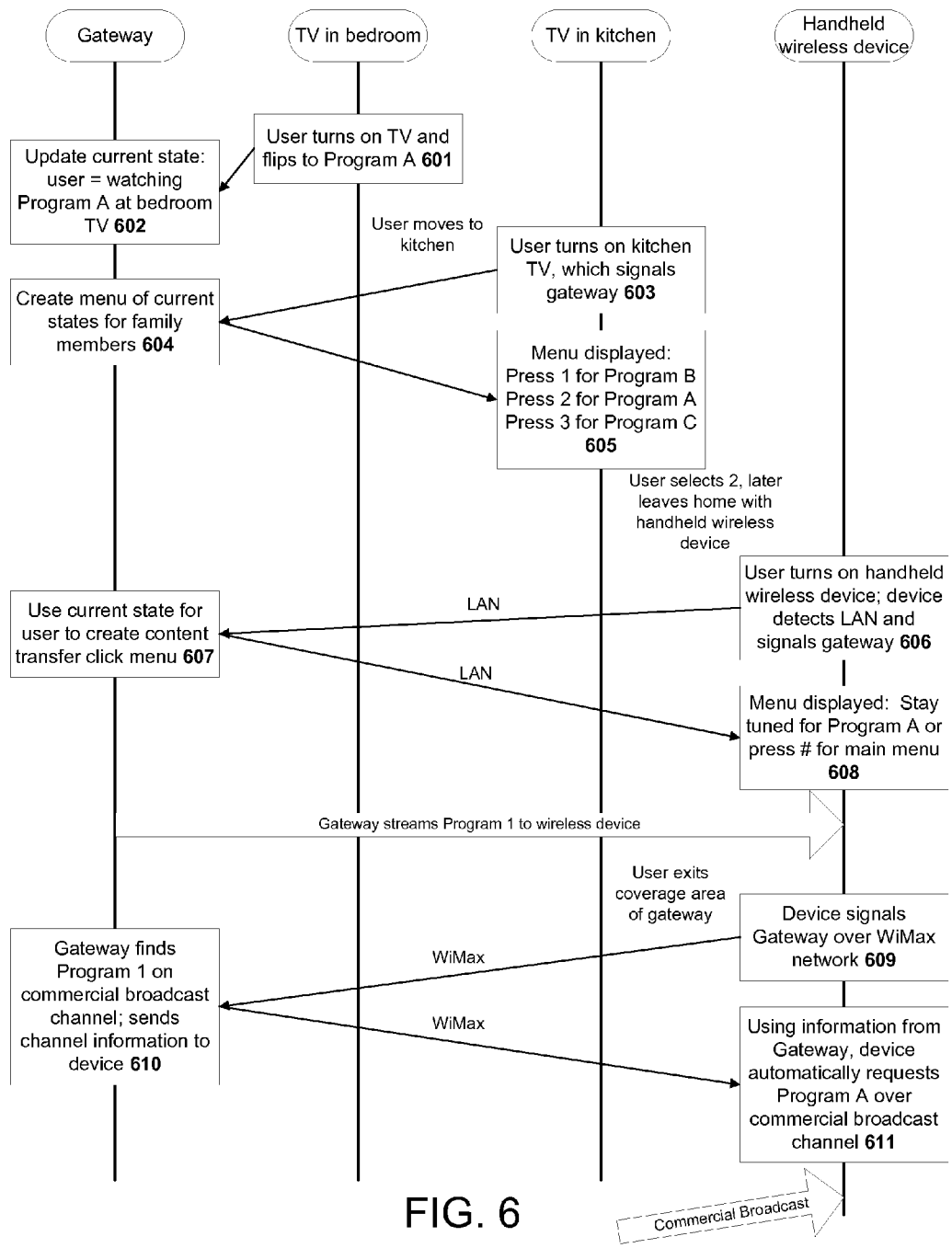
FIG. 6 illustrates an example of the content transfer feature.

FIG. 6 illustrates an example of the content transfer feature. First, the user turns on the TV in the bedroom and flips to Program A (step 601). The gateway 101 updates the current state for the user to "user=watching Program A at bedroom TV" (step 602). The user then moves to the kitchen. The user turns on the kitchen TV, which signals the gateway 101 (step 603). The gateway 101 creates a menu of current states for family members (step 604). At the kitchen TV, the menu is displayed (step 605). In this example, the menu displays "Press 1 for Program B", "Press 2 for Program A", and "Press 3 for Program C". Assume that the user selects "2" for Program A. Program A is then displayed on the kitchen TV. The user later leaves home with a handheld wireless device. The user turns on the handheld wireless device, and the device detects a LAN and signals the gateway 101 (step 606).

Through the LAN, the gateway 101 uses the current state for the user to create a content transfer menu for the handheld wireless device (step 607). The menu is displayed on the handheld wireless device (step 608), such as "Stay tuned for Program A or press # for main menu". The gateway 101 then streams Program A to the handheld wireless device.

If the user exits the coverage area of the gateway 101, the handheld wireless device signals the gateway 101 over an alternate network, such as a WiMax network (step 609). The gateway 101 finds Program A on a commercial broadcast channel and sends the channel information to the handheld wireless device (step 610). Using the information from the gateway 101, the handheld wireless device automatically requests Program A over the commercial broadcast channel (step 611). Program A is then streamed to the handheld wireless device from the commercial broadcast.

In one embodiment, when switching the stream from one device to another, the gateway 101 is aware of the identity of the user watching. Various ways may be used for the gateway 101 to gain this awareness, including the user signing in when viewing or having certain devices linked to a user's identity.

In an alternative embodiment, when the gateway 101 is switching to another device, the gateway 101 can show a list of all active streams, and let the user quickly choose which one to use.

In another alternative embodiment, the role of the gateway 101 can be assigned to the web portal 106 (FIG. 1A) instead. The tracking of streams, maintaining tokens for the location of the streams, and offering a list of current streams to the user occurs in the same manner.

Content Sharing Feature

Occasionally, while a user is watching some content at a certain device, the user wishes to instantly share the content with others. In the current state of the art, the user would have to leave the device and make a phone call, send an email, send an instant message, etc. to inform the others. The others would then have to search and find the content, which may be complicated by the fact that the others may not have local access to the content or, if the content is on TV, the TV channel has a different number.

Figure 7:
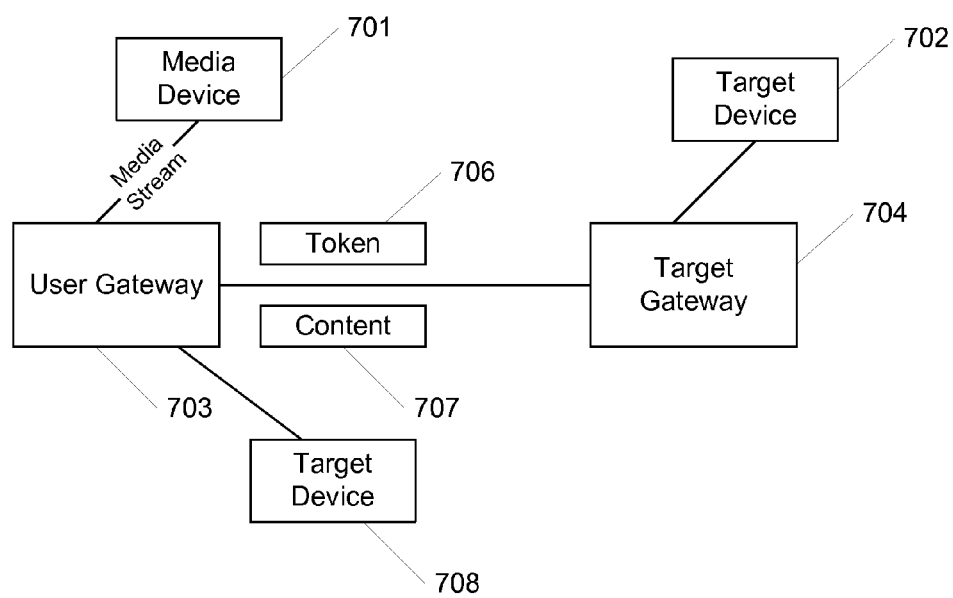
FIGS. 7 and 8 illustrate the content sharing feature provided by the gateway.
Figure 8:
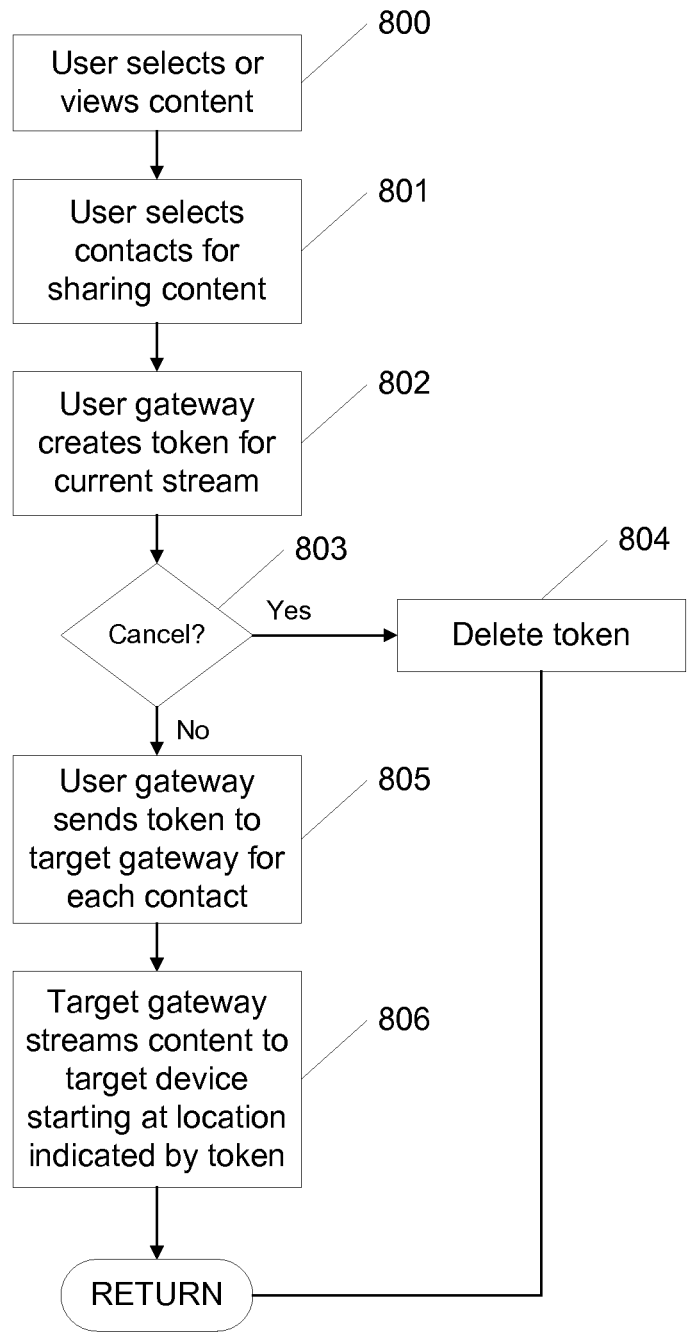

The gateway 101 according to the invention solves this problem by allowing users to instantly share the content using the content sharing feature. FIGS. 7 and 8 illustrate the content sharing feature provided by the gateway 101. The user views content at media device 701 via a media stream from the user's gateway 703 (step 800). The user selects contacts for the sharing of the content (step 801). The user gateway 703 creates a token 706 for the current stream (step 802). If the user decides to cancel this feature (step 803), the user gateway 703 deletes the token (step 804). If the user decides to continue, the user gateway 703 sends the token 706 to the target gateway 704 for each contact (step 805). If the contacts are associated with different target gateways, then a copy of the token is sent to each target gateway. The target gateway 704 streams the content to the target device 702 starting at the location indicated by the token 706 (step 806). If the target device is local to the user gateway 703, then the target gateway 704 and the user gateway 703 are the same gateway, and the content is streamed from the user gateway 703 directly to the local target device 708. The target gateway 704 can search for a local stream access for the content. If found, the target gateway 704 streams the content from the local stream to the target device 702, starting at the location indicated by the token 706. If not found, the user gateway 703 can stream the content to the target gateway 704, which then streams it to the target device 702.

Figure 9:
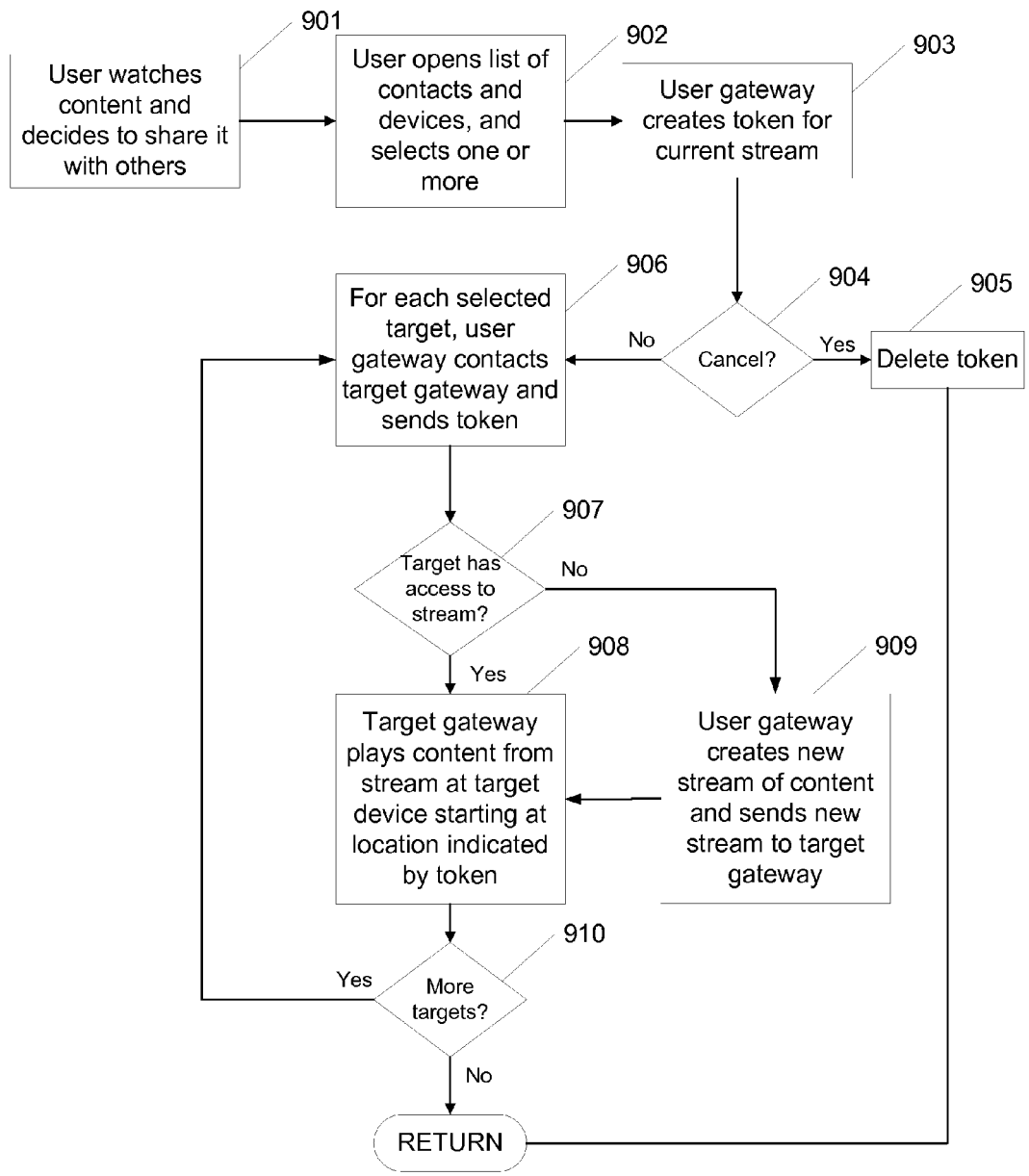
FIG. 9 is a flowchart illustrating in more detail the content sharing feature.

FIG. 9 is a flowchart illustrating in more detail the content sharing feature. First, the user watches the content and decides to share it with others (step 901). The user opens a list of contacts and devices saved on the user gateway 703, and selects one or more of them (step 902). Optionally, the sharing can be pre-defined, where the user sets the contacts and devices ahead of time. The user gateway 703 creates a token 706 for the current stream (step 903), in the manner as described above with reference to FIG. 2B. If the user decides to cancel this feature (step 904), the user gateway 703 deletes the token (step 905). If the user decides to continue, for each selected target, the user gateway 703 contacts the target gateway 704 and sends the token 706 (step 906). The target gateway 703 is configured to access the location information from the token and to distribute the content to the target device starting at the location corresponding to the location information. The target gateway 703 then determines if it has access to a stream (step 907). If so, the target gateway 704 plays the content from the stream at the target device 702 starting at the location indicated by the token 706 (step 908). If the target gateway 703 does not have access to a stream (step 907), then the user gateway 703 creates a new stream of the content 707 and sends the new stream to the target gateway 704 (step 909). The target gateway 704 then plays the stream at the target device 702 starting at the location indicated by the token 706 (step 908). Steps 906 through 909 are then repeated for the next target (step 910). Optionally, the user gateway 703 can assume that it has to stream the content, or the user gateway 703 can assume that local streams are available and thus does not stream the content.

Figure 10:
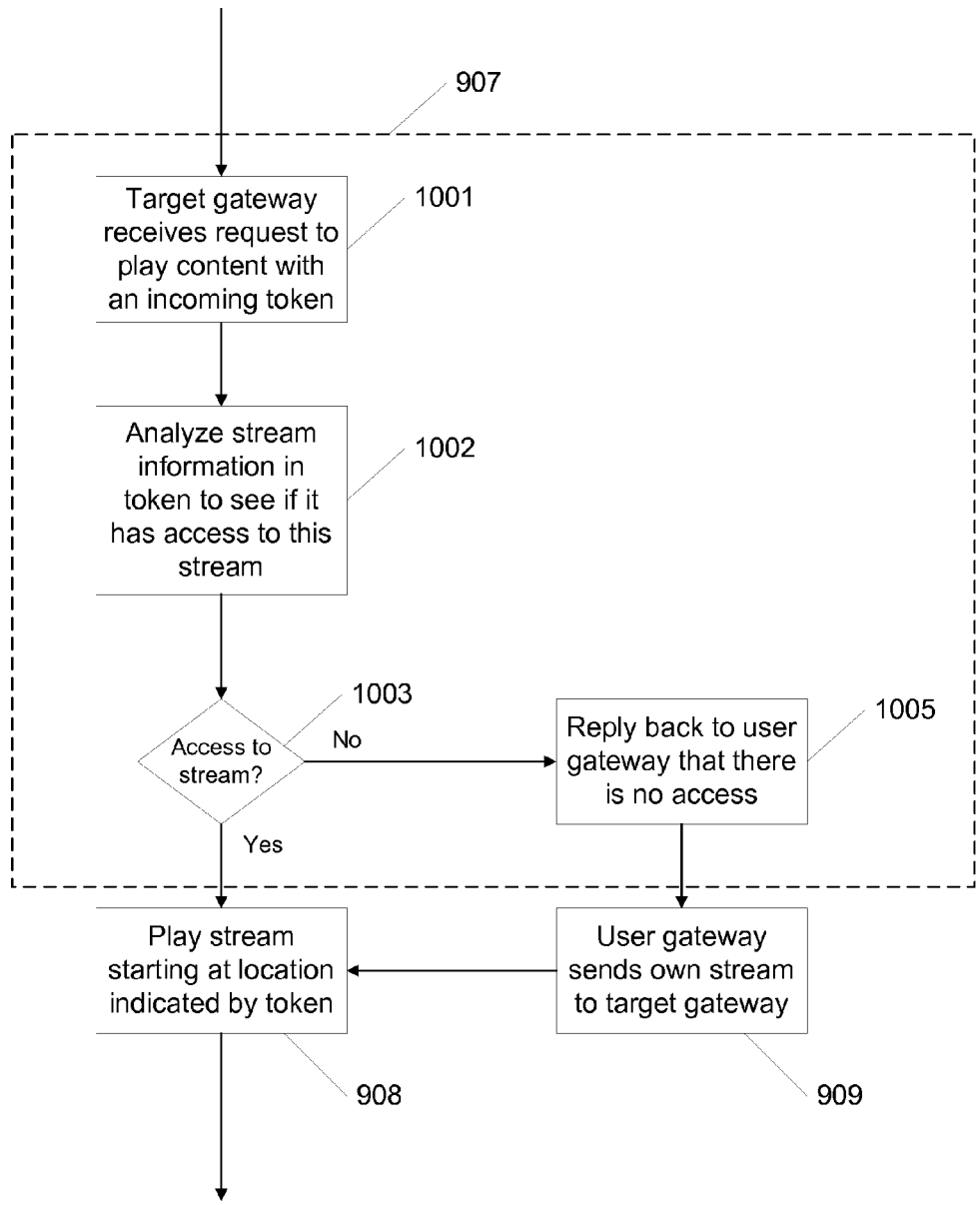
FIG. 10 illustrates in more detail the determination by the target gateway whether it can access the content directly.

FIG. 10 illustrates in more detail the determination by the target gateway 704 whether it has access to a stream (step 907). First, the target gateway 704 receives a request to play the content with an incoming token 706 (step 1001). The target gateway 704 analyzes the stream information in the token 706 to see if it has access to this stream (step 1002), such as via a LAN or WAN. If the target gateway 704 has access (step 1003), then the stream is played at the location indicated by the token 706 using the stream (step 908). If the target gateway 704 does not have access (step 1003), then the target gateway 704 replies back to the user gateway 703 that there is no access to the content (step 1005). The user gateway 703 then sends its own stream 707 of the content to the target gateway 704 (step 909). The stream is then played at the location indicated by the token 706 (step 908).

Content Access Monitoring Feature

A user may wish to monitor the viewing activities of another in a household, network, or community. For example, parents may wish to monitor what their children see. Although some media devices offer parental control functions, the process is not very flexible and is fairly easy to circumvent. This task is complicated by the various media formats and devices available to our youth today.

Figure 11:
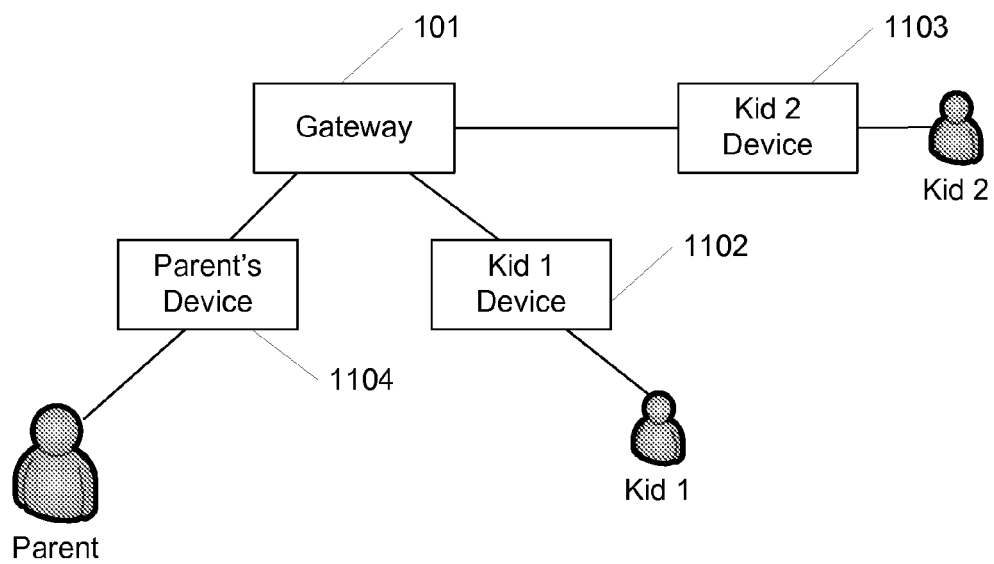
FIG. 11 illustrates the content access monitoring feature provided by the gateway.

The gateway 101 according to the invention solves this problem by allowing a user to monitor what others are watching from their own devices connected to the gateway 101. FIG. 11 illustrates an example of the content access monitoring feature provided by the gateway 101. Here, the parent's device 1104, and the kids' devices 1102, 1103 are connected to the gateway 101. Assume that the kids are watching their respective content on their devices 1102, 1103. The kids' devices 1102, 1103 can be a TV, a computer, a mobile media player, etc. From the parent's device 1104, the parent can use the gateway 101 to view what the kids are watching on their devices 1102, 1103.

Figure 12:
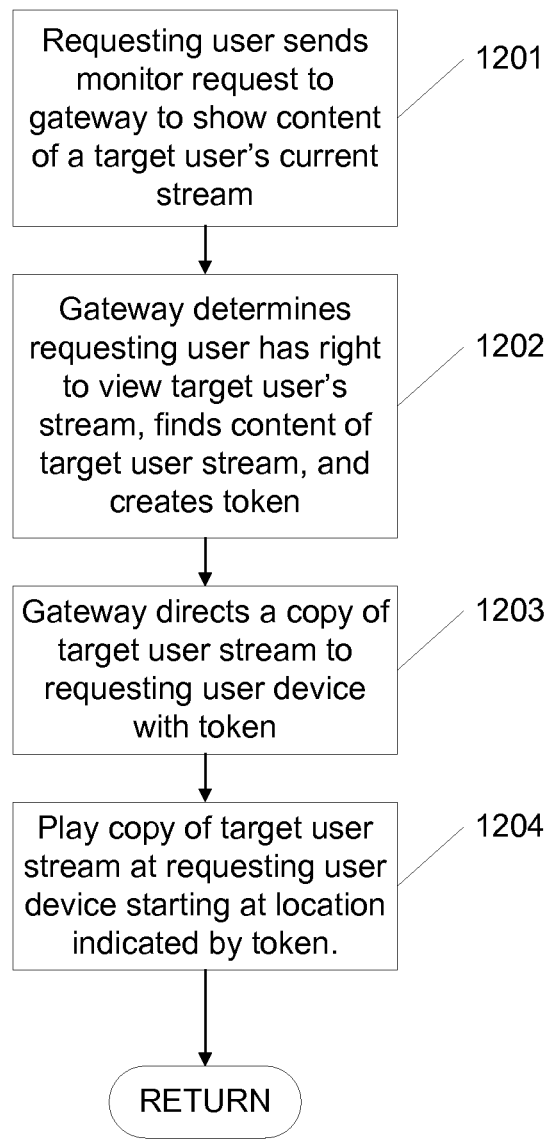
FIG. 12 is a flowchart illustrating the content access monitoring feature provided by the gateway.

FIG. 12 is a flowchart illustrating the content access monitoring feature provided by the gateway 101. A requesting user sends a monitor request to the gateway 101 to show the content on one or more target users' current stream (step 1201). The monitor request includes a target user identifier. The gateway 101 determines that the requesting user has the right to view the target user's stream, finds the content of the target user stream (step 1202), and creates a token. The token includes information on the content and the current location within the content. The gateway 101 then directs a copy of the target user stream to the requesting user's device (step 1203). The copy of the target user stream is then played at the requesting user's device starting at the location indicated by the token (step 1204).

To enable the content access monitoring functionality, the gateway 101 is aware of either the exact identity of the user watching a device, or which devices are considered to belong to which user. The identity can be determined by users signing in when viewing, as described above. Alternatively, certain devices can be linked to a user's identity. The gateway 101 can offer this through a web-interface and allow a manager to create identities of users, associate them with devices, and set rules for who can perform which activities. For example, the manager can prevent kids from viewing what the parents are viewing.

In one embodiment, the gateway 101 performs basic authentication based on the requesting user's identity and determines if the operation is allowed. Knowing both the requesting user's and the target user's current active devices, the gateway 101 can perform the stream-redirection logically from any device to any device. For example, if the target user is using the computer, a stream representing the current view of the computer can be displayed. If multiple streams are active that could be used by multiple target users, the requesting user can step through them one at a time. Optionally, the gateway 101 could automatically step through all active streams in the house or network. This could be based on user feedback (click to see next stream) or based on a timer (X seconds delay on each stream).

In supporting identity and device redirections, the gateway 101 understands the configuration of the area it supports. This can be achieved by the user going, for instance, to a web page, to define the configuration he wants. The user selects the devices involved in the network, and creates an identity for each user. Fields such as password, PIN, fingerprint, nickname, preferences, etc. can be associated with an identity. Then, the identity and the devices could be linked.

Figure 13:
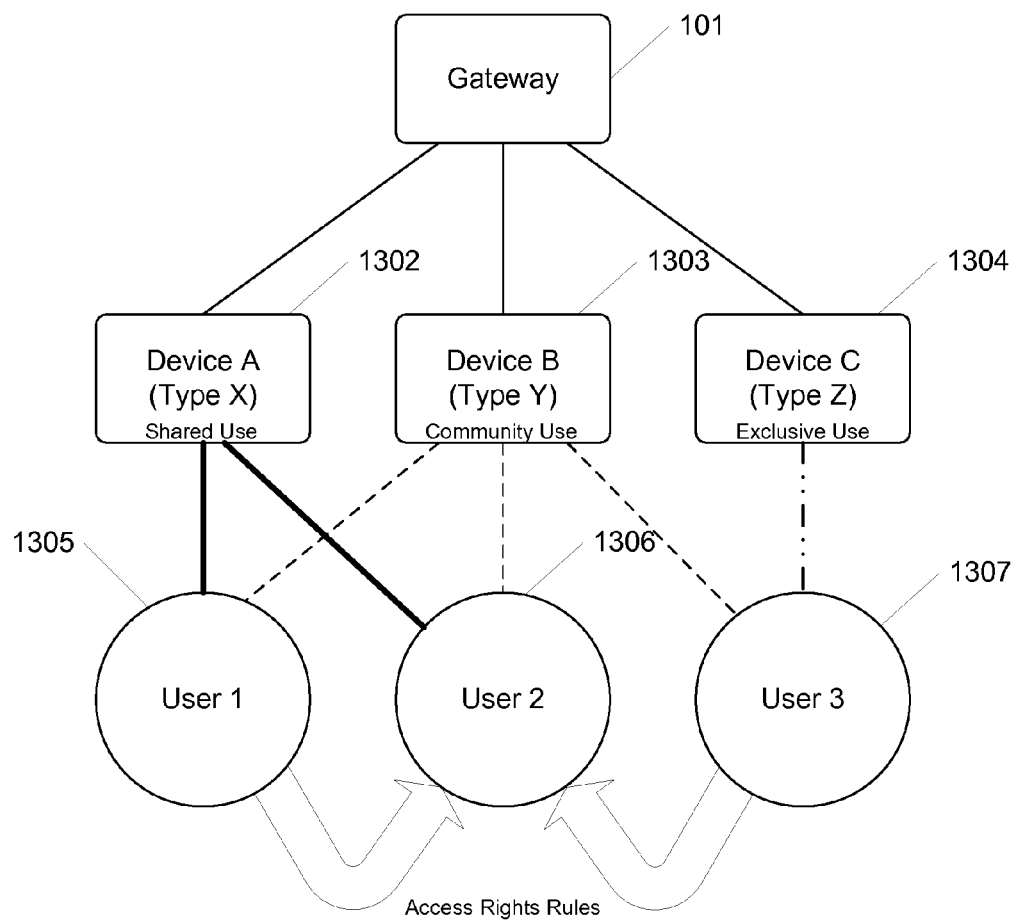
FIG. 13 illustrates example relationships between the gateway, devices, and identities in the content access monitoring feature.

FIG. 13 illustrates example relationships between the gateway 101, devices and identities in the content access monitoring feature. Device C (1304) could be linked exclusively to User 3 (1307). Any time Device C (1304) is used, the gateway 101 would know that User 3 (1307) is active on that. Similarly, Device B (1303) is configured to be for "community use", which means anyone could be using it. The gateway 101 can automatically apply the strictest rules for Device B (1303), which could require a pin-code or password to override. Device A (1302) may be configured for "shared use" between User 1 (1305) and User 2 (1306). Again, the strictest rules for User 1 (1305) and User 2 (1306) could be applied by the gateway 101.

Between users, rules can be configured as to who has rights "over" the others. In the example in FIG. 13, User 1 (1305) and User 3 (1307) has control over User 2 (1306). This means that User 1 (1305) and User 3 (1307) can "see" what User 2 (1306) is watching, while User 2 (1306) cannot see what User 1 (1305) or User 3 (1307) are watching. Any variations of rules could be applied, such as using time of day, specific channels, monitoring, device ownership, etc.

Alternatively, the content access monitoring can be expanded to communities. A user can create a small community consisting of family members, in different locations throughout the country. The family is connected through a network of gateways, and each family member has signed up to participate in the community. Using the gateway 101, a user can quickly scan and see what the rest of the family is watching.

The target user could be watching the content at a device associated with a different gateway. If so, then the request is sent from the gateway 101 to this target gateway. The target gateway creates the token, and sends the token to the gateway 101. The gateway 101 then plays back the content at the requesting user's device starting at the location indicated by the token. In playing the content, the gateway 101 can either use a local stream or use a stream from the target gateway.

Content Access Approval Feature

Some users, such as parents, take steps to monitor what their children see. Occasionally, the kid wishes to view content that a parent has blocked and wants to ask permission to view the blocked content. In the current state of the art, the kid has to contact the parent and attempt to describe the content. If the parent wishes to preview the content, the parent must search and find the content, assuming it is available. This process is inefficient.

The gateway 101 according to the invention solves this problem by providing a content access approval feature. With this feature, a requester can select an "ask for permission" option on the gateway 101 for a content. The gateway 101 then contacts one or more approvers with details of the request, and the approver has to option to accept or reject the request.

Figure 14:
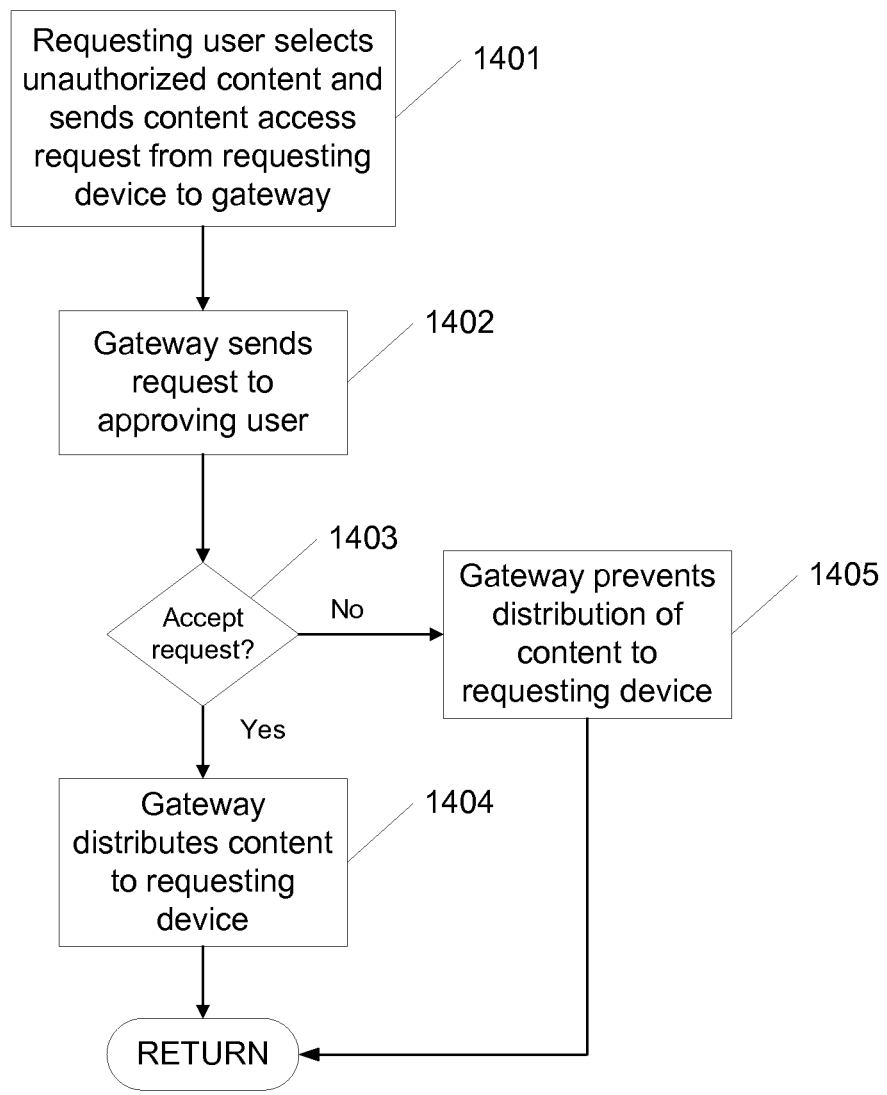
FIG. 14 is a flowchart illustrating the content access approval feature provided by the gateway.

FIG. 14 is a flowchart illustrating the content access approval feature provided by the gateway 101. First, a requesting user, such as a kid, selects an unauthorized content, attempting to view it. Realizing it is blocked, the requesting user sends a content access request from a requesting device to the gateway 101 (step 1401). The content access request includes a requesting user identifier corresponding to the requesting user and content information identifying the content. The gateway 101 then forwards the request to at least one target device corresponding to at least one approving user identifier, which corresponds to an approving user (1402). The approving user can be any authorizing user, such as one or both parents, another adult, a babysitter, etc. The approving user can choose to accept or reject the request. If the request is accepted (step 1403), then the gateway 101 distributes the content to the requesting device (step 1404). If the request is rejected (step 1403), then the gateway 101 prevents distribution of the content to the requesting device (step 1405).

Figure 15:
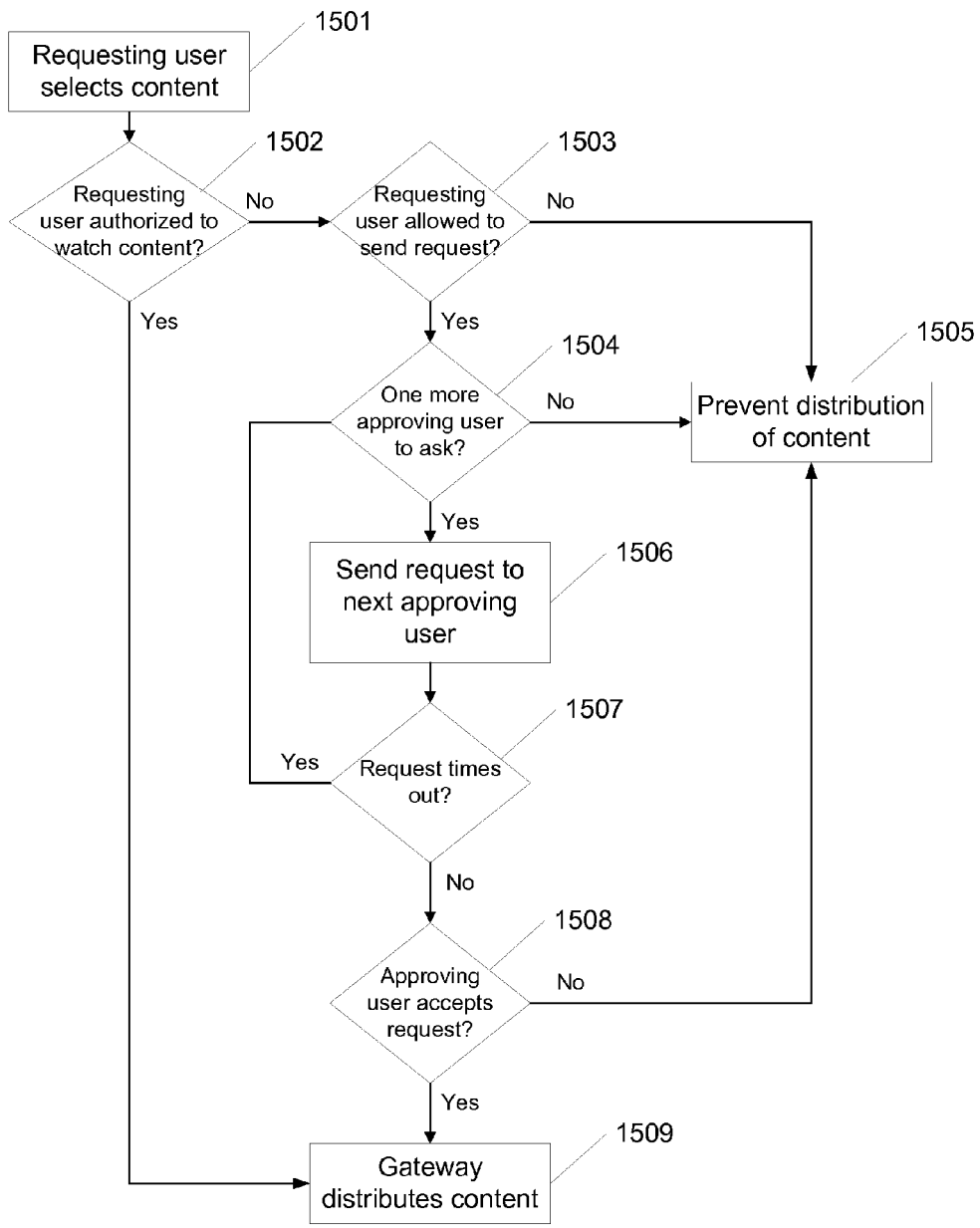
FIG. 15 is a flowchart illustrating in more detail the content access approval feature.

FIG. 15 is a flowchart illustrating in more detail the content access approval feature. First, a requesting user selects a content (step 1501). The gateway 101 determines if the requesting user is authorized to watch the content (step 1502). If so, then the gateway 101 plays the content (step 1509). If the requesting user is not authorized, the gateway 101 determines if the requesting user is allowed to ask for permission to view the content (step 1503). For example, the number of requests from the requesting user can be limited to a certain number per day, per hours, number of times for the same show, etc. If not, then the gateway 101 prevents access to the content (step 1505). If the requesting user is allowed to ask for permission, then a request is sent to an approving user (step 1506). The approving user may then accept or reject the request. The approving user can be given the option to preview the content before deciding. The content can then be played for the approving user in the same manner as described above with the content access monitoring feature. Optionally, a time limit can be placed on responding to the request, where if the request times out, it is automatically determined to be rejected. If the request times out (step 1507), the gateway 101 determines if there's another approving user to ask (step 1504). The list of approving user can be limited to one or more persons. If there is another approving user on the list, then the gateway 101 sends the request to that approving user (step 1506). If no approving user accepts the request (step 1508), then the gateway 101 prevents access to the content (step 1505). If one of the approving users accepts the request (step 1508), then the gateway 101 plays the content (step 1509).

When configuring the approving users, the list of approving user can be prioritized, which determines the order in which the approving users are queried. The list of approving users can also be configured to ask the next person until the end is reached, and then start over. In this manner, requests are spread out over the entire list. The list can be tied to a date or time period in which request may be made. Requests may be automatically accepted or rejected if it falls within a certain date or time. Automatic acceptance or rejection can also be set up based on keywords or TV channels.

Optionally, content that is accepted can trigger a notification to the one or more of the other approving users on the list that specific content is being watched. Optionally, acceptance from more than one approving user may be required. For example, a kid may be required to receive acceptance from both parents before permission is granted to view the content.

Simulated Multimedia Streams Feature

In the current state of the art, it may not possible to show Internet content on a TV or other display device, without that content being interpreted by a computer, or by having a built-in browser in the device itself.

The gateway 101 according to the invention solves this problem by providing a simulated multimedia stream. Here, the gateway 101 acts as an intermediary between the Internet and the target display device, where the gateway 101 converts specific Internet content into simulated video streams. The simulated video streams can be sent to any target display device and played back as a regular channel.

Figure 16:
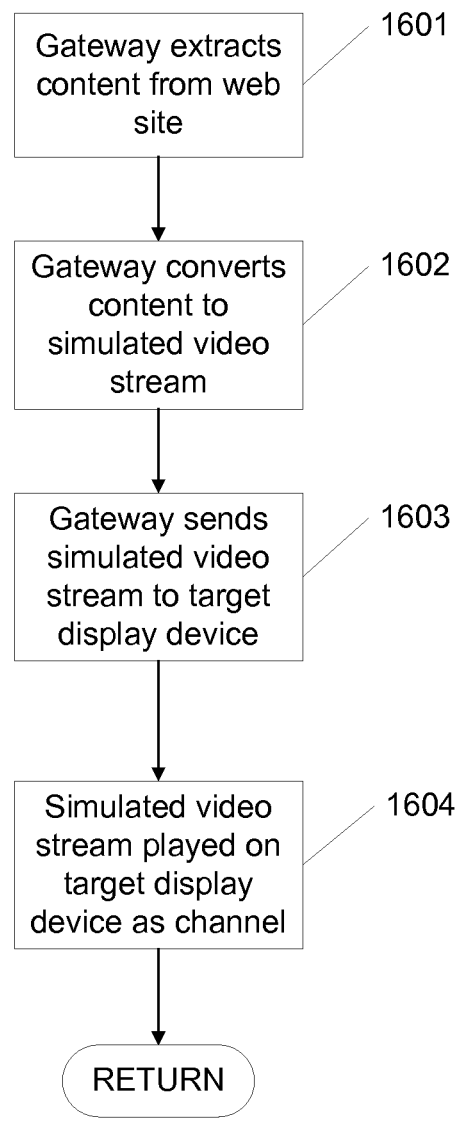
FIG. 16 is a flowchart illustrating the simulated multimedia streams feature provided by the gateway.

FIG. 16 is a flowchart illustrating the simulated multimedia streams feature provided by the gateway 101. First, the gateway 101 extracts content from a web site (step 1601) via a communications link. The gateway 101 converts the content to a simulated video stream (step 1602) and sends the simulated video stream to a target display device, such as a TV, which is configured to display the simulated video stream (step 1603). The device plays the simulated video stream as a regular channel (step 1604). If the target display device is a TV, the simulated video stream is displayed as a regular TV channel.

The simulated multimedia streams can be set up on the gateway 101 using a pre-defined stream and/or from a user created stream. A network can provide pre-generated streams that are available through a personal program guide offered by the gateway 101. For example, the guide can include local weather, local road conditions, local webcams, etc. To create his own simulated multimedia stream, a user can go onto a web portal and configure the new stream. Optionally, a browser can be built into the gateway 101 from which the user can configure the streams. Each content can be named, and this name is shown to the user. Optionally, if the target display device is a TV, the content names can be merged with the TV guide, so that the simulated channel is listed along with regular TV channels.

Figure 17:
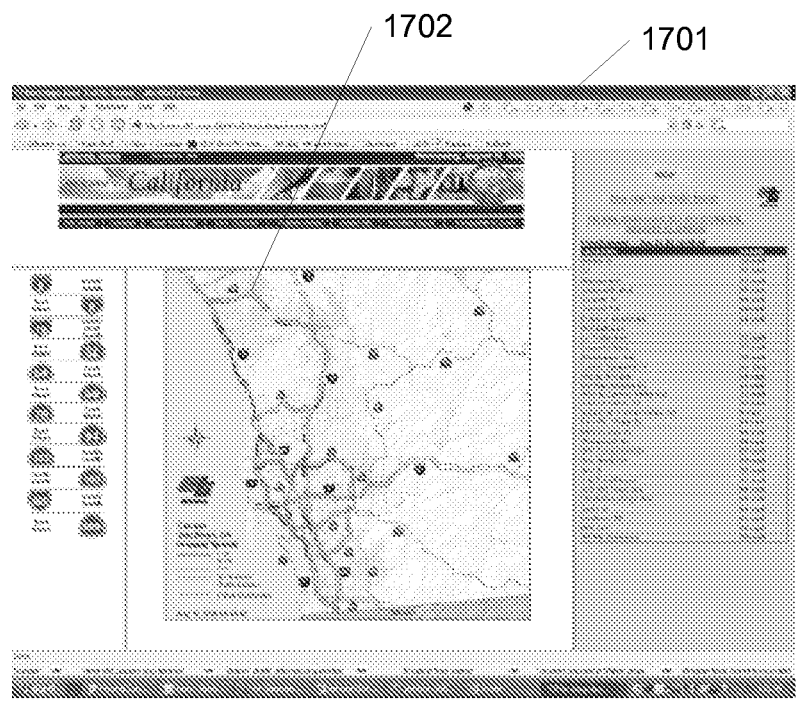
FIG. 17 illustrates an example web site and simulated video stream provided by the simulated multimedia streams feature.
Figure 17:
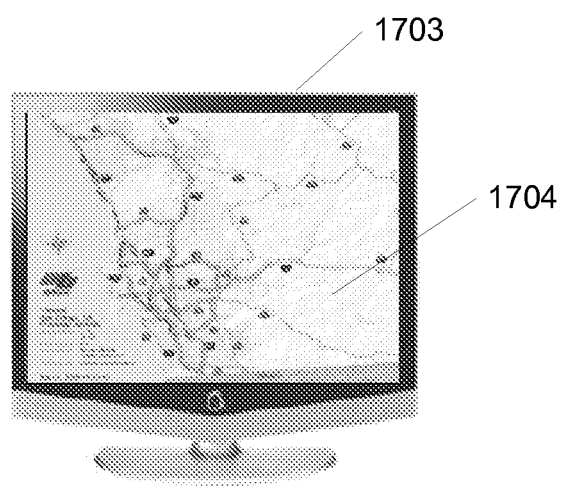

In extracting content from a web site, the gateway 101 can capture the content at certain intervals. For example, the content can be extracted from the web site each second as an image. These images can then be sequenced to simulate a video stream. This simulated video stream is then sent to the target display device to be played as if it is another channel. FIG. 17 illustrates an example web site for local road conditions. Some content 1702 on the web site 1701 is extracted from the gateway 101, converted to a simulated video stream 1704, and sent to the target display device 1703 for playback.

Significantly, this feature does not require the web site 1701 or the target display device to change. The feature is encapsulated within the gateway 101.

Optionally, sub-channels for a simulated multimedia stream can be provided, where each sub-channel displays a subset of content available from the same web site. For example, in the example shown in FIG. 17, one sub-channel can show the list of freeways, one sub-channel can show the map of the current congestion, and one sub-channel can show the list of current speeds on each freeway. Instead of offering a channel for each of these streams, sub-channels are provided that allow the user to switch between these views. For instance, this could be implemented by scrolling left and right while watching one of these channels.

Shadow Download Feature

The downloading of content onto various devices is growing in popularity. Content for a mobile device, a personal computer, a cellular phone, etc. are available for download and playback. However, often each of these devices requires a different resolution or format for the same content. For example, content downloaded for use on a mobile device may not have the proper resolution to be viewed on a personal computer with satisfactory results. Similarly, content downloaded for use on a personal computer may have a resolution too high for the mobile device to be able to play. Thus, in the current state of the art, a user must download and manage multiple resolutions or formats separately for the same content, if the user wishes to play the content on different devices.

Figure 18:
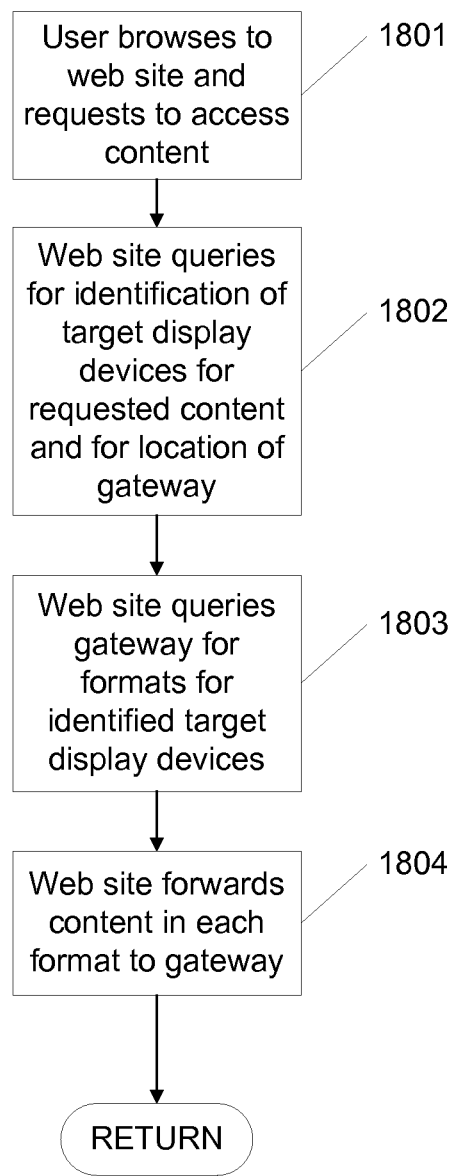
FIG. 18 is a flowchart illustrating the shadow download feature provided by the gateway.

To solve this problem, the gateway 101 according to the invention provides a shadow download feature, where if a user downloads content, the user also has access to other resolutions or formats of the same content via the gateway 101. FIG. 18 is a flowchart illustrating the shadow download feature provided by the gateway 101. The user browses to a web site and requests to purchase content (step 1801). The web site queries the user for an identification of devices for the content and for the location of the gateway 101 (step 1802). The web site then queries the gateway 101 for the formats for the identified devices (step 1803). The web site then pushes the content in each format to the gateway 101 (step 1804). In one embodiment, the gateway 101 and the web site both record the selected resolution and format for future recommendation when the user purchases content.

Figure 19:
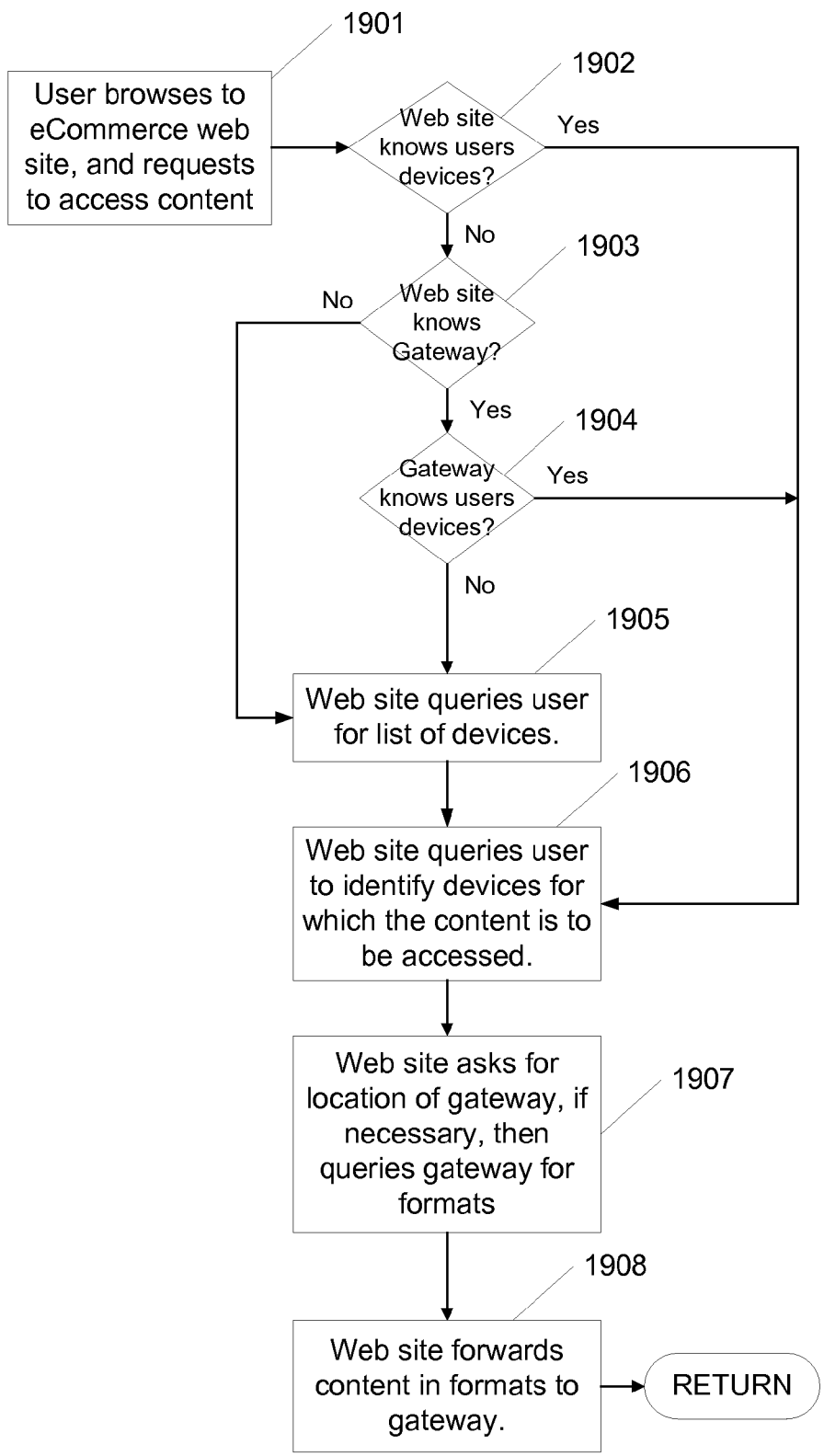
FIG. 19 is a flowchart illustrating in more detail the shadow download feature.

FIG. 19 is a flowchart illustrating in more detail the shadow download feature. The user browses to an eCommerce web site and sends a request to access multimedia content, where the request includes a user identifier corresponding to the user (step 1901). If the web site knows of the user's target display devices (step 1902), for instance, by synchronizing with the gateway 101, then the web site simply queries the user to identify the devices for which the content is to be accessed.

If the web site does not know of the user's target display devices or of the gateway 101 (steps 1902 and 1903), then the web site queries the user for a list of his devices and to identify the devices for which the content is to be accessed (steps 1905 and 1906).

If the web site does not know of the user's target display devices but knows of the gateway 101 (steps 1902 and 1903), and the gateway 101 knows of the user's target display devices (step 1904), the web site can obtain the list of the user's devices from the gateway 101. The web site then queries the user to identify the devices for which the content is to be accessed (step 1906).

If neither the web site nor the gateway 101 knows of the user's target display devices (steps 1902 through 1904), the web site queries the user for a list of devices and to identify the devices for which the content is to be accessed (step 1905).

The web site asks for the location of the gateway 101, if necessary, and then queries the gateway 101 for the formats for the identified target display devices (step 1907). After receiving the formats, the web site forwards the content in each format to the gateway 101 (step 1908).

When the user chooses to view the content on a target display device, the gateway 101 can stream the content to the device in the device's corresponding format. Similarly, when the user chooses to view the same content on another device, the gateway 101 can stream the content in that device in its appropriate corresponding format.

In each of the features described above, tags may be created for the content. These tags are stored with the content, either embedded or separately. When the content, or a copy thereof, is sent across devices or gateways, the tags can be sent as well. The tags may also be shared independently of the content. Thus, when a content is played using a local or alternate stream, the embellishments in the tags are displayed along with the content.

A method and system for integrated personal content access have been disclosed. The system includes a gateway which is able to communicate across devices, coordinating media content distribution among the devices and users. The gateway can seamlessly switch or copy content streams from one device to another, even if the devices use different formats or protocols. Tags for adding embellishments to content on the fly for viewing by the user or by others. Tokens for indicating the identity and source of the content, along with a location within content, can also be used when sharing content or when switching between devices. Additionally, a network of gateways is possible, where content may be shared between devices connected to different gateways.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing integrated content access to a user, comprising:

receiving a selection of a multimedia content from a target display device, the target display device being a different display device than an initial display device, and the target display device is associated with an identity of the user;

updating a current viewing state associated with the identity of the user;

accessing a token corresponding to the multimedia content, the token indicating an offset in the multimedia content corresponding to a position within the multimedia content, wherein the offset is null for unviewed multimedia content;

determining whether the target display device has direct access to the multimedia content from a first streaming source;

and responsive to determining that the target display device does not have direct access to the multimedia content from the first streaming source, encoding, at a content management device, the multimedia content starting at the offset indicated by the token and sending the encoded multimedia content from the content management device to the target display device starting at the offset indicated by the token for display upon receipt at the target display device.

2. The method of claim 1, further comprising:
determining whether the multimedia content was partially-viewed at the initial display device by the user;
responsive to determining that the multimedia content has been partially-viewed at the initial display device by the user:
determining whether the multimedia content is a paused stream; responsive to determining that the multimedia content is not a paused stream:
creating a temporary token corresponding to the multimedia content; and
accessing the temporary token and sending the multimedia content to the target display device starting at an offset retrieved from the temporary token for display upon receipt at the target display device.

3. The method of claim 1, further comprising:
determining a best source for the multimedia content; and
sending the multimedia content to the target display device from the best source starting at the offset indicated by the token for display upon receipt at the target display device.

4. The method of claim 3, wherein the determining the best source comprises:
if the target display device does not have direct access to the multimedia content from the first streaming source, determining if the multimedia content is available through an alternate streaming source.

5. The method of claim 4, wherein the determining the best source further comprises:
if the multimedia content is available through the alternate streaming source, sending the multimedia content to the target display device starting at the offset indicated by the token for display upon receipt at the target display device.

6. The method of claim 4, wherein the multimedia content is encoded responsive to determining the multimedia content is not available through the alternate streaming source.

7. The method of claim 1, further comprising:
receiving a request to pause the displaying of the multimedia content at the target display device; and
creating a second token in response to the request, wherein the second token comprises information about a second offset within the multimedia content displaying at the target display device.

8. The method of claim 1, wherein the offset is one of time based and frame based.

9. A content management device configured to provide integrated content access to a user, the content management device comprising:
at least one content distribution interface connected by at least one communication link to an initial display device and a target display device, the target display device being a different display device than the initial display device, and the target display device being associated with an identity of the user;
at least one processor configured to execute at least one computer-executable instruction sequence; and
a computer-readable memory storing the at least one computer-executable instruction sequence, which upon execution of the at least one computer-executable instruction sequence by the processor causes the processor to perform:
receiving, at the content management device, a selection of a multimedia content from the target display device;
updating a current viewing state associated with the identity of the user;
accessing a token corresponding to the multimedia content, the token indicating an offset in the multimedia content corresponding to a position within the multimedia content, wherein the offset is null for unviewed multimedia content;
determining whether the target display device has direct access to the multimedia content from a first streaming source; and
responsive to determining that the target display device does not have direct access to the multimedia content from the first streaming source, encoding, at a content management device, the multimedia content starting at the offset indicated by the token and sending the encoded multimedia content from the content management device via the content distribution interface to the target display device starting at the offset indicated by the token for display upon receipt at the target display device.

10. The device of claim 9, upon execution of the at least one computer-executable instruction sequence by the processor further causes the processor to perform:
determining whether the multimedia content was partially-viewed at the initial display device by the user;
responsive to determining that the multimedia content has been partially-viewed at the initial display device by the user:
creating a temporary token corresponding to the multimedia content; and
accessing the temporary token and sending the multimedia content to the target display device starting at an offset retrieved from the temporary token for display upon receipt at the target display device.

11. The device of claim 9, wherein execution of the at least one computer-executable instruction sequence by the processor further causes the processor to perform:
determining a best source for the multimedia content; and
sending the multimedia content to the target display device from the best source starting at the offset indicated by the token for display upon receipt at the target display device.

12. The content management device of claim 9, wherein the offset is one of time based and frame based.

13. A non-transitory computer readable medium with program instructions for providing integrated content access to a user, comprising instructions for:
receiving a selection of a multimedia content from a target display device, the target display device being different than an initial display device, and the target display device being associated with an identity of the user;
updating a current viewing state associated with the identity of the user;
accessing a token corresponding to the multimedia content, the token indicating an offset in the multimedia content corresponding to a position within the multimedia content, wherein the offset is null for unviewed multimedia content;

determining whether the target display device has direct access to the multimedia content from a first streaming source; and responsive to determining that the target display device does not have direct access to the multimedia content from the first streaming source, encoding, at a content management device, the multimedia content starting at the offset indicated by the token and sending the encoded multimedia content from the content management device to the target display device starting at the offset indicated by the token for display upon receipt at the target display device.

14. The non-transitory computer readable medium of claim 13, wherein the offset is one of time based and frame based.

15. A method for a user gateway to share digital content with one or more target devices, comprising:

receiving a selection of one or more target contacts with which to share the digital content being displayed on a source device;

creating a token, for each target contact of the one or more target contacts, associated with the digital content, each token comprising offset information corresponding to a previously presented offset within the digital content;

sending each token to a respective target gateway associated with each selected target contact of the one or more selected target contacts, each target gateway being configured to access the offset information from the token and to distribute the digital content to a respective target device starting at the offset corresponding to the offset information, each target gateway being different than the user gateway;

receiving a reply from each target gateway to request access, responsive to the respective gateway not having direct access to a stream of the digital content from a respective first streaming source;

encoding the digital content at a second source; and streaming a new stream of the encoded digital content from the second source to each target gateway that replied to request access.

16. The method of claim 15, the receiving comprising:

receiving a request for a list of target contacts;

displaying the list of target contacts at the source device; and receiving the selection of one or more target contacts with which to share the digital content being displayed on the source device.

17. The method of claim 15, the sending further comprising:

determining, for each target gateway, if the target gateway can access the digital content.

18. The method of claim 15, further comprising:

creating the new stream of the digital content.

19. The method of claim 15, wherein the offset is one of time based and frame based.

* * * * *